(12) United States Patent
Kanai et al.

(10) Patent No.: US 10,711,912 B2
(45) Date of Patent: Jul. 14, 2020

(54) SOLENOID VALVE DRIVE CONTROL DEVICE AND SOLENOID VALVE COMPRISING SOLENOID VALVE DRIVE CONTROL DEVICE

(71) Applicant: Saginomiya Seisakusho, Inc., Tokyo (JP)

(72) Inventors: Yuji Kanai, Sayama (JP); Ryusuke Suzuki, Sayama (JP)

(73) Assignee: SAGINOMIYA SEISAKUSHO, INC., Tokyo (JP)

( * ) Notice: Subject to any disclaimer, the term of this patent is extended or adjusted under 35 U.S.C. 154(b) by 337 days.

(21) Appl. No.: 15/765,612

(22) PCT Filed: Sep. 3, 2016

(86) PCT No.: PCT/JP2016/075917
§ 371 (c)(1),
(2) Date: Apr. 3, 2018

(87) PCT Pub. No.: WO2017/061200
PCT Pub. Date: Apr. 13, 2017

(65) Prior Publication Data
US 2019/0078700 A1   Mar. 14, 2019

(30) Foreign Application Priority Data
Oct. 6, 2015 (JP) ................. 2015-198605

(51) Int. Cl.
*F16K 31/00* (2006.01)
*F16K 31/06* (2006.01)
(Continued)

(52) U.S. Cl.
CPC .......... *F16K 31/0675* (2013.01); *F16K 31/06* (2013.01); *H01F 7/18* (2013.01); *F25B 41/04* (2013.01); *G05F 1/462* (2013.01)

(58) Field of Classification Search
CPC ........ F16K 31/0675; F16K 31/06; H01F 7/18; F25B 41/04; G05F 1/462
See application file for complete search history.

(56) References Cited

U.S. PATENT DOCUMENTS 5,975,053 A * 11/1999 Rodier .................... F02D 41/20
                                                                  123/446
2010/0242920 A1 * 9/2010 Omori ..................... F02D 41/20
                                                                  123/490
(Continued)

FOREIGN PATENT DOCUMENTS

CN     1109229 A    9/1995
CN     1324443 A    11/2001
(Continued)

OTHER PUBLICATIONS

Extended European Search Report issued in corresponding European Application No. 16853354.5, dated Jun. 24, 2019, 5 pages.
(Continued)

*Primary Examiner* — Harry R Behm
(74) *Attorney, Agent, or Firm* — Snyder, Clark, Lesch & Chung, LLP

(57) ABSTRACT

(Problem)
The invention is to provide to a solenoid valve drive control device, in which though the magnetic path is normally composed (i.e. the plunger is attached to the attracting member), it is never determined by mistake as the dropout, and it is never entered into the reabsorption mode of the plunger.
(Resolution Approach)
The invention is a solenoid valve drive control device of the invention, in which by controlling of the zero cross timing generation device 72, after application of the electric current to the solenoid 66 is started at zero cross timing by the switching device 68, when the current value that flows to the (Continued)

solenoid 66 detected by the electric current sensing device 78 reaches the circuit protection electric current value Ic (αA), a stabilization mode that repeats the ON-OFF cycle plural times (four times of the total in the Embodiment of FIG. 4), in which application of the electric current to the solenoid 66 is interrupted by the switching means 84, is operated (see A5-A8 in FIG. 4).

8 Claims, 17 Drawing Sheets

(51) Int. Cl.
*H01F 7/18* (2006.01)
*G05F 1/46* (2006.01)
*F25B 41/04* (2006.01)

(56) References Cited

U.S. PATENT DOCUMENTS

| | | | |
|---|---|---|---|
| 2010/0275662 A1* | 11/2010 | Kervinen | E05B 47/026 70/91 |
| 2010/0308243 A1* | 12/2010 | Bedingfield | F16K 7/045 251/129.15 |
| 2017/0108139 A1* | 4/2017 | Nieddu | F02D 41/222 |
| 2017/0299080 A1 | 10/2017 | Kanai | |
| 2019/0170078 A1* | 6/2019 | Nishimura | F02D 41/20 |

FOREIGN PATENT DOCUMENTS

| | | |
|---|---|---|
| CN | 101344183 A | 1/2009 |
| CN | 103161990 A | 6/2013 |
| DE | 102010046977 A1 | 9/2011 |
| JP | S59-98215 A | 6/1984 |
| JP | 4-287850 A | 10/1992 |
| JP | 2011027064 A * | 2/2011 |
| JP | 2014-105722 A | 6/2014 |
| JP | 2016-75318 A | 5/2016 |
| WO | 2015017882 A1 | 2/2015 |

OTHER PUBLICATIONS

Office Action issued in corresponding Chinese Application No. 201680054136.8, dated Dec. 24, 2018, 12 pages.

International Search Report issued in corresponding International Application No. PCT/JP2016/075917, dated Nov. 15, 2016, 9 pages.

* cited by examiner

SOLENOID VALVE DRIVE CONTROL DEVICE AND SOLENOID VALVE COMPRISING SOLENOID VALVE DRIVE CONTROL DEVICE

TECHNICAL FIELD

The invention relates to a solenoid valve drive control device. In more detail, the invention relates to a solenoid valve drive control device and a solenoid valve comprising the solenoid valve drive control device, in which the alternating current from the AC power supply is converted into direct current by using the full-wave rectification, and a valve element installed in the plunger is moved, attached to and separated from a valve seat by applying this direct current to the solenoid (electromagnetic coil), and a valve port formed to the valve seat is opened and closed.

BACKGROUND ART

Conventionally, for instance, a general solenoid valve is composed as shown in FIG. 14.

That is, as shown in FIG. 14, a solenoid valve 200 is provided with a control unit 204 comprising a valve element 202.

Moreover, the control unit 204 of this solenoid valve 200 is provided with an electromagnetic coil 208 through which a driving portion 206 is passed as shown in FIG. 14.

In addition, the electromagnetic coil 208 is provided with a bobbin 220 where the winding wire is rolled, and as to surround the periphery of the bobbin 220, it is molded with a molding resin 212. In addition, as shown in FIG. 14, the electromagnetic coil 208 is provided in a magnetic frame 214, and fixed to the driving portion 206 by the magnetic frame 214.

That is, the driving portion 206 is inserted in a driving portion inserting through hole 218 formed at the center section of a base plate portion 216 of the magnetic frame 214 and a driving portion inserting through hole 222 of the bobbin 220. In addition, into a bolt inserting through hole 226 formed at the upper part of an attracting member 224 of the driving portion 206, a fastening bolt 232 is screwed together, through a bolt inserting through hole 230 formed at the center section of an upper plate portion 228 of the magnetic frame 214.

As a result, an electromagnetic coil 208 is inserted in the driving portion 206 and is fixed, so that a control unit 204 of the solenoid valve 200 is composed.

In addition, the driving portion 206 is provided with a plunger casing 234, and a plunger 236 in which the valve element 202 is fixed that can be moved upwardly and downwardly in this plunger casing 234. In addition, between the attracting member 224 and the plunger 236, the plunger 236 is urged downwardly, that is, an urging spring 240 that urges the valve element 202 in the direction of the valve seat 238 is disposed.

As for such solenoid valve 200, by applying an electric current to the electromagnetic coil 208, the plunger 236 is moved in the directions of the attracting member 224 against the urging spring 240. As a result, the valve element 202 connected with the plunger 236 is separated from the valve seat 238, so that a valve port 242 is opened.

Moreover, by interrupting the application of the electric current to the electromagnetic coil 208, the plunger 236 is moved in the direction that separates from the attracting member 224 by the urging force of the urging spring 240. As a result, the valve element 202 connected with the plunger 236 abuts a valve seat 238, and the valve port 242 is closed.

Moreover, when the alternating current is applied to the electromagnetic coil 208, the magnetic flux is generated. Consequently, the plunger 236 is moved in the direction of the attracting member 224 against the urging spring 240. As a result, the state that the plunger 236 and the attracting member 224 abut each other, that is, the state that the valve element 202 is separated from the valve seat 238 and the valve port 242 is opened is maintained.

Conventionally, for the generation of the eddy current, in an annular groove 246 for the coil installation which is formed to a lower end surface 244 that faces to the plunger 236 of the attracting member 224, an annular shading off coil 248 (shading off ring) is installed.

In this case, the electromagnetic coil 208 which is used to drive the solenoid valve 200, power consumption is different in each power-supply voltage. Therefore, it is necessary to prepare it by the winding specification that does not exceed the temperature rise tolerance limit of electromagnetic coil 208.

Moreover, in the conventional solenoid valve 200, after the plunger 236 is attracted in the direction of the attracting member 224, it is necessary to keep the application of the electric current to electromagnetic coil 208. As a result, it is a fact to consume useless power.

By the way, in Patent Document 1 (JP 3777265, B), in order to attach the plunger which is integral to the valve element to a core and to hold attachment, a solenoid valve that controls electric current thrown to a coil is proposed. In this solenoid valve, the attraction is improved when the plunger is attached, and the electric current thrown to hold attachment is made a low current and unnecessary electricity consumption is reduced.

For that purpose, the solenoid valve drive control device 300 of this Patent Document 1, comprising, as shown in the block diagram of FIG. 15, a full-wave rectifier circuit portion 302 that converts the ac power supply into the dc power supply, and a power supply smooth portion 304 that takes out the voltage more than the definite value from the power-supply voltage which is made direct current by the full-wave rectifier circuit portion 302 and smoothes it. Moreover, a comparison operation portion 308 that controls the application of the electric current and the interruption of the application of the electric current to a solenoid (electromagnetic coil) 306, and a driver element portion 310 to which the application of the electric current and interruption of the application of the electric current to the electromagnetic coil 306 are operated by outputting of a comparison operation portion 308.

In addition, it comprises, in order to flow the electric current about twice as a minimum holding current necessary to make the core (attracting member) attach the plunger by them into electromagnetic coil 306, and an attaching electric current indication portion 312 that indicates the electric current application time to the comparison operation portion 308. Moreover, in order to flow the electric current necessary for holding attachment of the plunger and the core to the electromagnetic coil 306, an attachment holding current indication portion 314, in which instruction of time of the application of the electric current and interruption of the application of the electric current to the electromagnetic coil 306 is indicated to the comparison operation portion 308.

That is, by the dc power supply by the full-wave rectifier circuit portion 302, an electric current, which is necessary to make the plunger to be attached to the core, is flowed in the electromagnetic coil 306. As a result, the plunger is attached to the excited core.

In addition, the application of the electric current and interruption of the application of the electric current to the electromagnetic coil 306 by a driver element portion 310 are controlled on the basis of the output from the comparison operation portion 308. As a result, holding attachment is performed by the electric current about twice as a minimum holding current necessary for being flowed when attachment is held.

In that case, the electric current application time, for which the electric current necessary for the first attachment is flowed to the electromagnetic coil 306, is decided by the attaching electric current indication portion 312. Moreover, the and the time of application of the electric current and interruption of the application of the electric current, for which the electric current necessary for holding attachment after it is attached are applied and interrupted, is decided by the attachment holding current instruction portion 314.

As a result, the electric current applied to the electromagnetic coil 306 can be increased to the maximum. Consequently, when the plunger is attached and is held to the core, the electric current that flows to the electromagnetic coil 306 becomes a low current and unnecessary electricity consumption can be reduced.

However, in the solenoid valve drive control device 300 of Patent Document 1, as shown in the drawing, the shading off coil (shading off ring) is installed in the core (attracting member). Therefore, power-factor worsens by inserting the shading off coil. As a result, moreover, the predetermined attraction is not obtained by the temperature rise of the electromagnetic coil by the application of the electric current. Consequently, the winding wire of the electromagnetic coil should be extra rolled, and it becomes a factor that the cost increases.

Moreover, in the solenoid valve drive control device 300 of Patent Document 1, after the plunger is attracted in the direction of the attracting member, a minimum holding current should keep being applied to the electromagnetic coil. As a result, useless power is consumed.

On the other hand, in Patent Document 2 (JP4911847, B), the air conditioning machine comprising the solenoid valve controller is disclosed.

That is, the solenoid valve controller 400 of Patent Document 2 comprises, as shown in the block diagram of FIG. 16, a positive characteristic temperature coefficient element 404, which is connected with a valve coil 402 of the four-way switching solenoid valve, and a relay 406 as the first switching device, which is connected with the positive characteristic temperature coefficient element 404.

Moreover, a diode D1 in which the cathode is connected with the valve coil 402, and a transistor Q1 as the second switching device in which collector is connected with anode of the diode D1 are provided.

In addition, a control unit 408, in which a control signal is output to the relay 406 and a control signal is output to the base of a transistor Q1 through a resistance R1, is provided.

Moreover, to the other end of relay 406, direct current high voltage (DC280V) from a power unit 410 for the inverter for the inverter circuit where the compressor of the air conditioning machine is driven is applied. In addition, to the emitter of transistor Q1, direct current low voltage (DC16V) from a power unit 412 for the control of the inverter circuit of the air conditioning machine is applied.

As a result, the relay 406 as the first switching device and the transistor Q1 as the second switching device are switched.

Consequently, direct current high voltage (DC280V) is supplied from the power unit 410 for the inverter to drive the compressor of the air conditioning machine. Moreover, direct current low voltage (DC 16V) is supplied from the power unit 412 for the control of the air conditioning machine. Therefore, the solenoid valve mechanical power source need not be separately prepared, and the cost can be reduced.

However, as for this construction, the power unit 410 for the inverter to drive the compressor of the air conditioning machine and the power unit 412 for the control of the air conditioning machine are necessary. Therefore, it can be insistently used for only the air conditioning machine, and it is not possible to use it for other usages generally.

After the plunger is attracted in the direction of the attracting member, a minimum holding current should keep being applied to the electromagnetic coil. As a result, useless power is consumed.

Therefore, the instant applicant, in Patent Document 3 (JP, 2014-105722, A), the solenoid valve drive control device is proposed. That is, in this solenoid valve driving control device, in an open valve drive period (A) for opening a valve port formed to the valve seat, after applying direct current high voltage (Va) to the solenoid, it is composed that a direct current low voltage (Vb) is applied for holding period (B) to hold the state of an open valve. Furthermore, when the supply voltage to the solenoid is switched from the open valve drive period (A) to the holding period (B), the voltage is decreased from direct current high voltage (Va) toward direct current low voltage (Vb) in the constant gradient. In such a way, the solenoid valve drive control device in which the voltage reduction device is provided is proposed.

As a result, the winding wire of the solenoid (electromagnetic coil) need not be extra rolled. Therefore, the member and number of processing are decreased, so that the cost can be reduced.

Moreover, after the plunger is attracted in the direction of the attracting member, a minimum holding current should keep being applied to the electromagnetic coil. However, the electric current is extremely low, and useless power never be consumed. Moreover, the phenomenon, in which the plunger is disengaged, is not be generated.

By the way, as for such a solenoid valve, the coiled body case is enlarged. Therefore, power that is required for attracting the plunger is also increased. In addition, when the coiled body case is large, the stray capacity of the coil is increased. As a result, big inrush current flows to the stray capacity at the superimposed voltage to the coil.

Moreover, when the inrush current is generated, the noise that originates in inrush current is occurred. It might not be able to meet EMC standard (Electromagnetic Compatibility) concerning the EMI measurement of a general standard among related standards.)

PRIOR ART REFERENCE

Patent Document

[Patent Document 1] JP 3777265, B
[Patent Document 2] JP 4911847, B
[Patent Document 3] JP, 2014-105722, A

SUMMARY OF INVENTION

Problems to be Solved by the Invention

In this situation, it is required that it is possible to be used in the alternating-current power supply voltage for commercial use (Effective voltage: 100 Vac-240 Vac), and the generation of the noise that originates in inrush current can be controlled by reducing inrush current to the stray capacity of the coil, and the energy conservation can be attained.

By the way, the solenoid valve driving control device of the following component is considered to solve such a problem.

That is, though not shown in the drawings, such a solenoid valve driving control device comprises, a switching device that provides and interrupts the application of the electric current to a solenoid, a zero cross timing generation device, in which the application of the electric current to the solenoid by the switching device is controlled so that the application of the electric current is started at zero cross timing during the power supply period, and an electric current sensing device that detects current value that flows to the solenoid.

In addition, as shown in FIG. 17, by controlling of the zero cross timing generation device, after the application of the electric current is started at zero cross timing (a1 in FIG. 17) to the solenoid by the switching device, when the current value that flows to the solenoid detected by the electric current sensing device reaches predetermined setting current value, i.e. circuit protection current value Ic (αA), an attaching operation mode in which the constant current is applied is operated (a1-a4 in FIG. 17). In addition, circuit protection electric current value Ic (αA) is in the rated current value or less of the drive circuit. Moreover, it is set that it suffices for the attracting current of the solenoid valve in the use loading condition.

In this attaching operation mode after the initial electric current application time is passed, at the predetermined setting current value, i.e. the circuit protection current value Ic (αA) (b1 in FIG. 17), an initial interruption mode, in which the application of the electric current to the solenoid is interrupted by the switching device, is operated.

In the initial interruption mode, where the current value that flows to the solenoid detected by the electric current sensing device is larger than predetermined electric current value Ia (βA)(a5 in FIG. 17), the application of the electric current is not provided to the solenoid even if it becomes zero cross timing.

In addition, after the initial interruption mode, as shown in FIG. 17, by controlling of the zero cross timing generation device, the application of the electric current to the solenoid is started at zero cross timing (a6 in FIG. 17) by the switching device.

When the current value that flows to the solenoid detected by the electric current sensing device reaches predetermined electric current value Ia (βA) (b2 in FIG. 17), an interrupted mode, in which the application of the electric current to the solenoid is interrupted by the switching device, is operated.

In addition, after this interruption mode, the holding power is generated by discharging the energy that accumulated in the solenoid through a snubber circuit until the following zero cross timing (a7 in FIG. 17). As a result, a hold mode, in which the current value that flows to the solenoid is set to reach predetermined holding electric current value Ib (γA) or more, is operated.

The value of the holding electric current value Ib (γA) is set to a value larger than predetermined dropout detection electric current value Id (δA) described later, and is set to a value smaller than predetermined electric current value Ia (βA).

In addition, these interruption modes and hold mode are repeated as shown in FIG. 17, and a stationary mode (power saving mode) is operated.

By the way, as shown in FIG. 17, in the attaching operation mode (time the initial electric current application time passage), there is a phenomenon that the lower limit of the electric current gradually increases (to a2-a4 of FIG. 17).

In this phenomenon, when the plunger is attached to the attracting member, the distance between the plunger and the attracting member becomes small. Therefore, this phenomenon is generated after the magnetic path resistance becomes small, and the phenomenon in which inductance L becomes large is occurred.

After the plunger is attached to the attracting member, since it is a full-wave rectification, it is well known that if the full-wave rectification is repeatedly put, residual magnetic flux density B grows more than the hysteresis property of the B-H curve. The inductance L is gradually increased to the extent that this residual magnetic flux density B is increased. After the residual magnetic flux density B is saturated, it can be considered that the inductance L becomes a definite value.

The increase and the decrease speed (time constant) of the electric current are determined by L/R. As a result, when the inductance L is increased, the time constant is increased. Consequently, the electric current decrease speed decreases, and the lower limit of the electric current increases. At the attaching operation mode, the excessive electric current enough for the attachment current is applied. As a result, the magnetic flux that accumulates in the coil becomes excessive, and the lower limit of the electric current increases gradually.

Since there is such a phenomenon, after the initial interruption mode, as shown in FIG. 17 and the enlarged view of FIG. 6, the lower limit of the electric current is not decreased sufficiently at the following zero cross timing (a6 in FIG. 17). As a result, a state, in which it is higher than the holding electric current value Ib (TA), is generated.

As a result, after application of the electric current begins at zero cross timing (a6 in FIG. 17), time T1 (b2 in FIG. 17) in which the current value flowed to the solenoid reaches the predetermined electric current value Ia (βA) becomes short. Therefore, such phenomenon is generated.

By the way, when the plunger is separated from the attracting member, inductance L of the magnetic path circuit is small. As a result, charge time (the risetime of the current waveform) becomes short.

Therefore, after application of the electric current begins at zero cross timing (a6 in FIG. 17), in case that the presence of the dropout is detected by the size at time T to reach the current value that flows to the solenoid to predetermined electric current value Ia (βA) (b2 in FIG. 17), since time T1 (b2 in FIG. 17) to reach the predetermined electric current value Ia (βA) becomes short, it will be determined by mistake as the dropout.

Therefore, though the magnetic path is normally composed (i.e. the plunger is attached to the attracting member), it might be a case that it is determined by mistake as the dropout, and it enters the reattaching mode of the plunger.

Moreover, since the current waveform is not stable like this, as for the current value that flows to the solenoid, in the interruption mode that interrupts the application of the electric current to the solenoid, the dispersion might be caused in the residual current value by zero cross that arrive after it falls below the predetermined electric current value Ia (βA).

That is, the problem that the optimum control cannot be done according to the product because it is determined as the state of release is caused.

Therefore, the object of the invention is to provide to a solenoid valve drive control device and a solenoid valve comprising the solenoid valve drive control device, in which it is possible to be used with the alternating-current power supply voltage for commercial use (Effective voltage: 100 Vac-240 Vac), and in which the generation of the noise that originates in inrush current can be controlled by reducing inrush current to the stray capacity of the coil, and in which the energy conservation can be attained.

Moreover, the object of the invention is to provide that, after the attaching operation mode (fixed time to the attaching operation mode time passage), inductance L is constant and the lower limit of the electric current is stable without the increase thereof, after the initial interruption mode, the lower limit of the electric current is decreased sufficiently at the following zero cross timing, so that the predetermined holding electric current value Ib (γA) is stable.

As a result, it is an object that, after the application of the electric current begins at zero cross timing, the time, in which the current value that flows to the solenoid reaches the predetermined electric current value Ia (βA), can be stable without shortening thereof.

As a result, it is an object that after the application of the electric current begins at the zero cross timing, in case that the presence of the dropout is detected by the size at time T to reach the current value that flows to the solenoid to predetermined electric current value Ia (βA), it is never determined by mistake as the dropout.

Therefore, it is also an object that though the magnetic path is normally composed (i.e. the plunger is attached to the attracting member), it is never determined by mistake as the dropout. Moreover, it is also an object that it never enters the reabsorption mode of the plunger.

Moreover, it is also an object that since the current waveform is stable like this, when the current value that flows to the solenoid is in the interruption mode that interrupts the application of the electric current to the solenoid, the dispersion is not caused in the residual current value by zero cross that arrive after it falls below the predetermined electric current value Ia (βA) and is stable.

Moreover, it is also an object that since it is never determined according to the product as the state of the release, the optimum control can be operated.

Solution to Problem

The invention was invented to attain the problem and the purpose in the above-mentioned prior art, and a solenoid valve drive control device of the invention, in which a plunger is moved by applying the electric current to a solenoid, a valve element installed in the plunger is moved, attached to, and separated from a valve seat, and enters into the state of an open valve by separating a valve element from the valve seat and attaching the valve element to the attracting member when the electric current is applied, the valve element abuts the valve seat and enters into the state of a closed valve when the electric current is not applied, the solenoid valve drive control device comprising, a switching device that provides and interrupts the application of the electric current to the solenoid, a zero cross timing generation device, that controls the application of the electric current to the solenoid by the switching device, so that the application of the electric current to the solenoid is started at zero cross timing in the power supply period, and an electric current sensing device that detects a value of an electric current that flows to the solenoid, an attaching operation mode in which, when the value of the electric current that flows to the solenoid detected by the electric current sensing device reaches a predetermined circuit protection electric current value Ic (αA), which is a predetermined electric current value for attaching the plunger, after the application of the electric current to the solenoid is started by the switching device, the plunger is attached by applying the constant electric current which is set to the predetermined attachment electric current value, a stabilization mode that, after the attaching operation mode, repeats, plural times, the ON-OFF cycle, in which application of the electric current to the solenoid is interrupted by the switching means when the value of the electric current that flows to the solenoid detected by the electric current sensing device reaches the circuit protection electric current value Ic (αA), after the application of the electric current to the solenoid is started at the zero cross timing by the switching device by controlling the zero cross timing generation device, an interruption mode in which after the stabilization mode, application of the electric current to the solenoid is interrupted by the switching means by controlling of the zero cross timing generation device when the value of the electric current that flows to the solenoid detected by the electric current sensing device reaches a predetermined electric current value Ia (βA), after the application of the electric current to the solenoid is started by the switching device at the zero cross timing, a hold mode in which, after the interruption mode, a holding power is generated by discharging an energy accumulated in the solenoid through a snubber circuit until a following zero cross timing after the interruption mode, and the value of the current that flows to the solenoid is set to reach predetermined holding electric current value Ib (γA) or more.

By component like this, application of the electric current to the solenoid by the switching device is controlled by the zero cross timing generation device so that application of the electric current is started at the zero cross timing during the power supply period.

As a result, inrush current to the stray capacity of the coil can be controlled. The generation of the noise can be controlled by so-called "Off phase control" by adjusting inrush current to the stray capacity of the coil to zero, and by accumulating energy in the solenoid (electromagnetic coil).

Moreover, when the power-supply voltage is 20V or less, inrush current to the stray capacity of the coil doesn't reach the value that exceeds the limit value of EMC standard, and the energy conservation can be attained.

In addition, in the interruption mode, by controlling of the zero cross timing generation device, after application of the electric current is started at zero cross timing to the solenoid by the switching device, when the current value that flows to the solenoid detected by the electric current sensing device reaches the predetermined electric current value Ia (βA), application of the electric current to the solenoid is interrupted by the switching device.

Moreover, in the hold mode, after interrupting application of the electric current to the solenoid by the switching device, the holding power is generated by discharging the energy that accumulated in the solenoid until the following zero cross timings through a snubber circuit, the current value that flows to the solenoid is set to reach the predetermined holding electric current value Ib (γA) or more.

As a result, the holding power is generated by discharging the energy accumulated in the solenoid until the following zero cross timings through a snubber circuit, the current value that flows to the solenoid is set to reach the predetermined holding electric current value Ib (γA) or more.

Therefore, after interrupting application of the electric current to the solenoid, in order that it does not become the holding electric current value Ib (γA) or less, for example, the circuit is switched to the snubber circuit that uses the diode. As a result, electricity is slowly discharged and the plunger can be kept attracting to the attracting member in the attaching state (state of an open valve). The energy conservation can be achieved.

Thus, the solenoid valve drive control device, in which it is possible to be used in the alternating-current power supply voltage for commercial use (Effective voltage: 100 Vac-240 Vac), and in which the generation of the noise that originates in inrush current can be controlled by reducing inrush current to the stray capacity of the coil, and in which the energy conservation can be attained, can be provided.

Moreover, in the attaching operation mode, after application of the electric current to the solenoid is started by the switching device, when the current value that flows to the solenoid detected by the electric current sensing device reaches the predetermined electric current value Ic (αA), attaching the plunger by applying the constant current which is set to the predetermined attachment current value, is operated.

That is, in applying the electric current at the attaching mode, regardless of the control timing of the zero cross timing generation means, in order to terminate the attaching operation mode within the fixed time, the power supply is applied, and the time passage means is operated. As for the time passage means, for instance, the time passage means may be composed by the use of the microcomputer on etc. In addition, it is composed that, after the lapse of the fixed time, that is, after the predetermined time passage of the attaching operation mode, the stabilization mode of the zero cross timing is started.

In this case, in the attaching operation mode, regardless of the control of the zero cross timing generation means, application of the electric current to the solenoid may be started by the switching means. Moreover, application of the electric current to the solenoid may be started along with the control of the zero cross timing generation means.

Moreover, after the attaching operation mode, by controlling of the zero cross timing generation device, after application of the electric current is started at zero cross timing to the solenoid by the switching device, when the current value that flows to the solenoid detected by the electric current sensing device reaches the circuit protection electric current value Ic (αA), the stabilization mode that repeats the ON-OFF cycle plural times, in which application of the electric current to the solenoid is interrupted by the switching means, is provided.

Therefore, in the stabilization mode, after the attaching operation mode (fixed time to the attaching operation mode time passage), inductance L is constant and the lower limit of the electric current is stable without the increase thereof, after the initial interruption mode, the lower limit of the electric current is decreased sufficiently at the following zero cross timing, so that it becomes the predetermined holding electric current value Ib (γA).

In addition, in the initial interruption mode, where the current value that flows to the solenoid detected by the electric current sensing device is larger than the predetermined electric current value Ia (βA), the electric current is not applied to the solenoid even if it becomes zero cross timing.

The value of the predetermined holding electric current value Ib (γA) is set a value larger than predetermined dropout detection electric current value Id (δA) described later, and is set a value smaller than the predetermined electric current value Ia (βA).

As a result, after application of the electric current begins at zero cross timing, time in which the current value flowed to the solenoid reaches the predetermined electric current value Ia (βA) does not become short and can be stable.

As a result, after application of the electric current begins at zero cross timing, in case that the presence of the dropout is detected by the size at time T to reaching the current value that flows to the solenoid to the predetermined current value Ia (βA), it is not determined by mistake as the dropout.

Therefore, though the magnetic path is normally composed (i.e. the plunger is attached to the attracting member), it would not be determined by mistake as the dropout, and it is never entered into the reabsorption mode of the plunger.

Moreover, since the current waveform is stable like this, as for the current value that flows to the solenoid, in the interruption mode that interrupts application of the electric current to the solenoid, the dispersion is not caused in the residual current value by zero cross that arrive after it falls below the predetermined electric current value Ia (βA) and it is stable. This is the available effect that in the electric current sensing means, where the attaching-release state is affirmed by the current value that flows to the solenoid.

As a result, the optimum control can be operated since it is not determined according to the product as the state of release.

Moreover, the solenoid valve driving control device of the invention is characterized in that, the current value of the holding electric current value Ib (γA) is a current value of the holding electric current value Ib (γA) or more that the plunger can sustain attaching to the attracting member.

Like this, the current value of the holding electric current value Ib (γA) is a current value of the holding electric current value Ib (γA) or more that the plunger can sustain attaching to the attracting member. As a result, the plunger can be kept attract to the attracting member in the state of the absorption (state of an open valve). In addition, the state of dropout, in which the plunger is separated from the state of attaching to attracting member, is not generated.

Moreover, the solenoid valve driving control device of the invention is characterized in that, in the hold mode, a dropout sensing device that detects the dropout in which the plunger is separated from the state of attaching to the attracting member is provided.

That is, in the solenoid valve drive control device of the invention, as mentioned above, an extra electric current is not flowed in the solenoid (electromagnetic coil). As a result, for instance, it might drop from the state that the plunger is attached to the attracting member by the cause of the change of some vibrations and pressures etc. (external cause).

When entering the state of the dropout like this, in the hold mode, the suction force to suck the plunger again cannot be generated. As a result, when it cannot be sucked again and the plunger is dropped by any chance, the dropout, in which the plunger is separated from the state of attaching to the attracting member, is detected by the dropout sensing device. Consequently, again application of the electric current to the solenoid is started, so that the dropout, in which the plunger is separated from the state of attaching to the attracting member, can be avoided. As a result, operation and the reliability are improved.

Moreover, the solenoid valve driving control device of the invention is characterized in that, in the dropout sensing device, the time, from the time when application of the electric current is started at the zero cross timing to the solenoid, to the time when the current value that flows to the solenoid detected by the electric current sensing means reaches the predetermined electric current value Ia (βA), is measured, and the dropout is detected by determining whether it is predetermined dropout detection time or not.

That is, in the dropout sensing device, the time, from the time when application of the electric current is started at the zero cross timing to the solenoid 66, to the time when the current value that flows to the solenoid 66 detected by the electric current sensing means 78 reaches the predetermined electric current value Ia (βA), may be measured, and the dropout may be detected by determining whether it is predetermined dropout detection time or not. For instance, in FIG. 7, according to whether it is larger or small than the predetermined power-supply voltage (see step S22), whether more greatly or small than the predetermined electric current application time (see step S23 and step S26) is measured and determined.

Moreover, in the interruption mode as above-mentioned, when the current value that flows to the solenoid 66 detected by the electric current sensing device 78 reaches the predetermined electric current value Ia (βA), the application of the electric current to the solenoid 66 is interrupted by the switching device 68.

In addition, required time t2 is from the time that application of the electric current is interrupted from the state that the plunger 46 attaches to the attracting member 34 (in case of high inductance), to the time to reach the predetermined electric current value Ia (βA). Moreover, required time t1 is from the time of the state that the plunger is dropped out (in case of low inductance), to the time to reach the predetermined electric current value Ia (βA). In this case, by the influence of the electromagnetic coil of charge time, in the state that the plunger 46 is dropped out (in case of low inductance), compared with the state that plunger 46 attaches to the attracting member 34 (i.e. high inductance), the electric current application time required for this charge is short.

The time required for this charge is measured, and the time (predetermined dropout detection time) required for the charge that becomes a threshold is decided. Consequently, whether the plunger 46 is dropped out or not can be determined. That is, the time, from the time when application of the electric current is started at the zero cross timing to the solenoid 66, to the time when the current value, which flows in the solenoid 66 detected by the electric current sensing device 78 reaches the predetermined electric current value Ia (βA), may be measured. Consequently, whether it is the predetermined dropout detection time or less may be determined and the dropout may be detected.

As a result, the dropout, in which the plunger is separated from the state of attaching to the attracting member, is detected by the dropout sensing device. Consequently, again application of the electric current to the solenoid is started, so that the dropout, in which the plunger is separated from the state of attaching to the attracting member, can be avoided. As a result, operation and the reliability are improved.

Moreover, the solenoid valve driving control device of the invention is characterized in that, in the dropout sensing means, a current value when application of the electric current is started at the zero cross timing to the solenoid is measured by an electric current sensing device, and whether it is the predetermined dropout detection electric current value Id (δA) or less is determined and the dropout is detected.

Like this, a current value when application of the electric current is started at the zero cross timing to the solenoid 66 is measured by the electric current sensing device 78, and whether it is the predetermined dropout detection electric current value Id (δA) or less is determined and the dropout is detected.

Therefore, this as indication (the predetermined dropout detection electric current value Id (δA)), the current value when application of the electric current is started at the zero cross timing to the solenoid 66 is measured by the electric current sensing device 78. Consequently, whether it is the predetermined dropout detection electric current value Id (δA) or less may be determined and the dropout may be detected.

As a result, the dropout, in which the plunger 46 is separated from the state of attaching to the attracting member 34 by the dropout sensing device, is detected. Furthermore, application of the electric current to the solenoid 66 is started again, so that the dropout in which the plunger 46 is separated from the state of attaching to the attracting member 34 can be avoided, and operation and the reliability are improved.

Moreover, in the solenoid valve driving control device of the invention, comprising a circuit protection means, in which, in the attaching operation mode, when the current value that flows to the solenoid detected by the electric current sensing device reaches the predetermined electric current value Ic (αA), application of the electric current to the solenoid is interrupted by the switching device.

That is, in the state that the plunger is at first away from the attracting member (i.e. state of no absorption), the small inductance (for instance, 0.2H) is revealed because the magnetic circuit is not made. On the other hand, in the state that the plunger is attached to the attracting member, the magnetic circuit is formed in the solenoid, and inductance is increased (for instance, 2.5H).

Therefore, it flows first only by resistance because there is resistance in the coil winding (i.e. coil direct current resistance 230 Ω). That is, the electric current of 1 A flows for instance if it is 200V. However, for instance, as for the switching device such as MOSFET (Metal Oxide Semiconductor Field Effect Transistor), for instance, in case that the one, in which only about 0.5 A can be flowed, is used, there is a possibility that the circuit breaks. Therefore, if entering the state that it flows more than the predetermined circuit protection electric current value (0.5 A for instance), application of the electric current is interrupted and the circuit is safeguarded.

Thus, at the time of an initial electric current application, the inductance of the solenoid (i.e. electromagnetic coil) is small, so that heavy-current is flowed. As a result, the current interruption security function for the circuit protection may be provided.

Like this, in the attaching operation mode, when the current value that flows to the solenoid detected by the electric current sensing device reaches the predetermined electric current value Ic (αA), application of the electric current to the solenoid is interrupted by the switching device, is provided. As a result, the circuit can be effectively safeguarded.

Moreover, the solenoid valve of the invention comprises the solenoid valve driving control device described above.

Advantageous Effects of Invention

According to the invention, application of the electric current to the solenoid by the switching device is controlled by the zero cross timing generation device so that application of the electric current is started at the zero cross timing during the power supply period As a result, inrush current to the stray capacity of the coil can be controlled. The generation of the noise can be controlled by so-called "Off phase control" by adjusting inrush current to the stray capacity of the coil to zero, and by accumulating energy in the solenoid (electromagnetic coil).

Moreover, when the power-supply voltage is 20V or less, inrush current to the stray capacity of the coil doesn't reach the value that exceeds the limit value of EMC standard, and the energy conservation can be attained.

In addition, in the interruption mode, by controlling of the zero cross timing generation device, after application of the electric current is started at zero cross timing to the solenoid by the switching device, when the current value that flows to the solenoid detected by the electric current sensing device reaches the predetermined electric current value Ia ($\beta$A), application of the electric current to the solenoid is interrupted by the switching device.

Moreover, in the hold mode, after interrupting application of the electric current to the solenoid by the switching device, the holding power is generated by discharging the energy that accumulated in the solenoid between the following zero cross timings through a snubber circuit, the current value that flows to the solenoid is set to reach the predetermined holding electric current value Ib ($\gamma$A) or more.

As a result, the holding power is generated by discharging the energy that accumulated in the solenoid between the following zero cross timings through the snubber circuit, the current value that flows to the solenoid is set to reach the predetermined holding electric current value Ib ($\gamma$A) or more.

Therefore, after interrupting application of the electric current to the solenoid, as for a longer period of holding current than the power supply period, for example, it is switched the circuit to the snubber circuit that uses the diode. As a result, electricity is slowly discharged and energy can be held so that the plunger can be kept attract to the attracting member in the state of the absorption (state of an open valve). The energy conservation can be achieved.

Thus, the solenoid valve drive control device, in which it is possible to be used in the alternating-current power supply voltage for commercial use (Effective voltage: 100 Vac-240 Vac), and in which the generation of the noise that originates in inrush current can be controlled by reducing inrush current to the stray capacity of the coil, and in which the energy conservation can be attained, can be provided.

Moreover, in the attaching operation mode, regardless of the control of the zero cross timing generation means, after application of the electric current to the solenoid is started at the zero cross timing by the switching device, when the current value that flows to the solenoid detected by the electric current sensing device reaches the predetermined electric current value Iç ($\alpha$A), attachment of the plunger by applying the constant current which is set to the predetermined attachment current value, is operated.

That is, in applying the electric current at the attaching mode, regardless of the control timing of the zero cross timing generation means, in order to terminate the attaching operation mode within the fixed time, the power supply is applied, and the time passage means is operated. As for the time passage means, for instance, the time passage means may be composed by the use of the microcomputer etc. In addition, it is composed that, after the lapse of the fixed time, that is, after the predetermined time passage of the attaching operation mode, the stabilization mode of the zero cross timing is started.

In this case, in the attaching operation mode, regardless of the control of the zero cross timing generation means, application of the electric current to the solenoid may be started by the switching means. Moreover, application of the electric current to the solenoid may be started along with the control of the zero cross timing generation means.

Moreover, after the attaching operation mode, by controlling of the zero cross timing generation device, after application of the electric current to the solenoid is started at the zero cross timing by the switching device, when the current value that flows to the solenoid detected by the electric current sensing device reaches the circuit protection electric current value Ic ($\alpha$A), the stabilization mode that repeats the ON-OFF cycle plural times, in which application of the electric current to the solenoid is interrupted by the switching means, is provided.

Therefore, in the stabilization mode, after the attaching operation mode (time to initial electric current application time passage). Therefore, inductance L is constant and it is stable without the lower limit of the electric current rising, after the initial interruption mode, the lower limit of the electric current is decreased sufficiently at the following zero cross timing, so that it becomes the predetermined holding electric current value Ib ($\gamma$A).

In addition, in the initial interruption mode, where the current value that flows to the solenoid detected by the electric current sensing device is larger than the predetermined electric current value Ia ($\beta$A), the electric current is not applied to the solenoid even if it becomes zero cross timing.

The value of the holding electric current value Ib ($\gamma$A) is set a value larger than the predetermined dropout detection electric current value Id ($\delta$A) described later, and is set a value smaller than the predetermined electric current value Ia ($\beta$A).

As a result, after application of the electric current begins at zero cross timing, time in which the current value flowed to the solenoid reaches the predetermined electric current value Ia (BA) does not become short and can be stable.

As a result, after application of the electric current begins at zero cross timing, in case that the presence of the dropout is detected by the size at time T to reaching the current value that flows to the solenoid to the predetermined electric current value Ia ($\beta$A), it is not determined by mistake as the dropout.

Therefore, though the magnetic path is normally composed (i.e. the plunger is attached to the attracting member), it would not be determined by mistake as the dropout, and it is never entered into the reabsorption mode of the plunger.

Moreover, since the current waveform is stable like this, as for the current value that flows to the solenoid, in the interruption mode that interrupts application of the electric current to the solenoid, the dispersion is not caused in the residual current value by zero cross that arrive after it falls below the predetermined electric current value Ia ($\beta$A) and it is stable. This is the available effect that in the electric current sensing means, where the attachment-release state is affirmed by the current value that flows to the solenoid.

As a result, the optimum control can be operated since it is not determined according to the product as the state of release.

DESCRIPTION OF EMBODIMENTS

Figure 1:
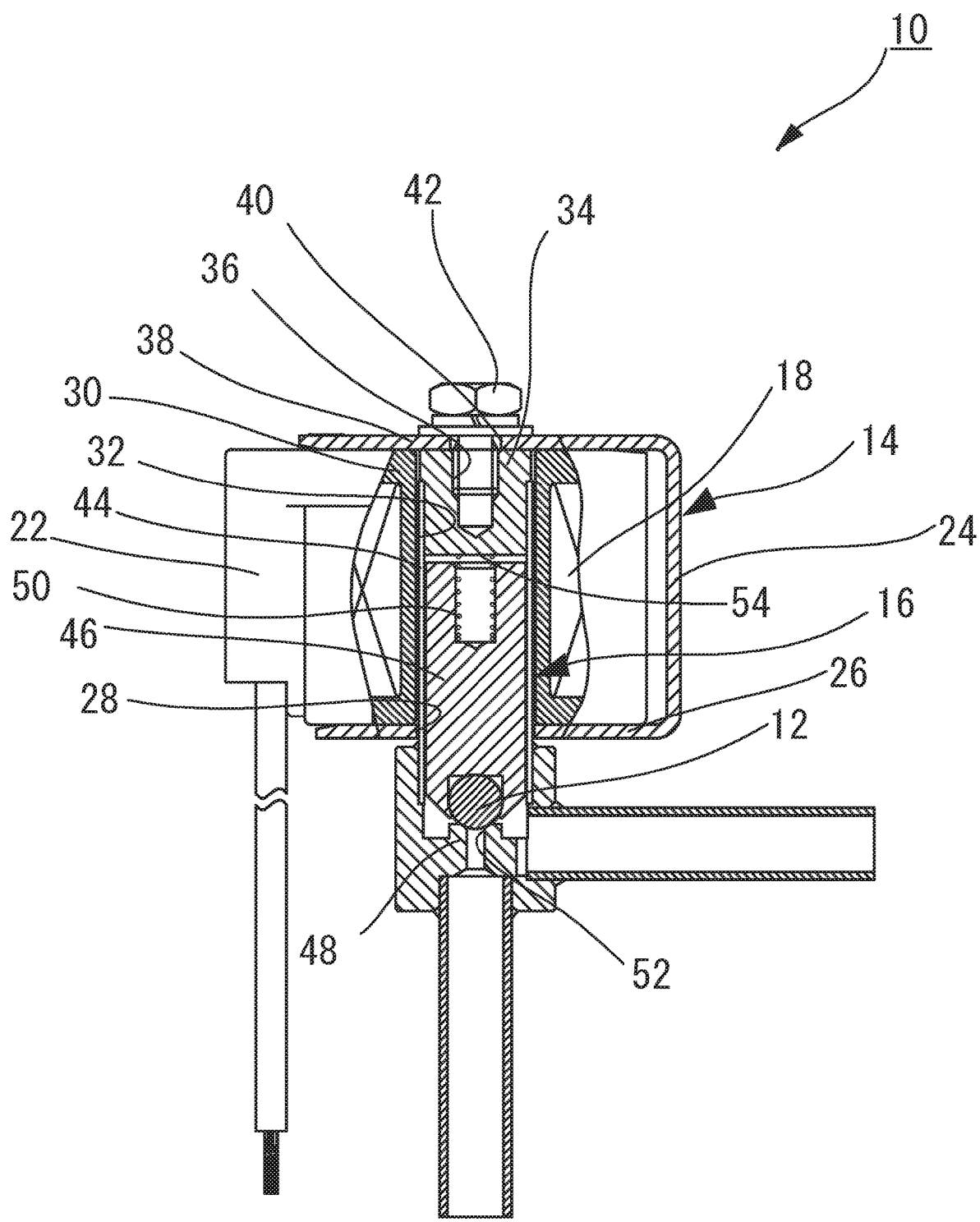
FIG. 1 is a longitudinal sectional view of the solenoid valve that applies the solenoid valve driving control device of the invention.

Hereafter, the embodiment of the invention (Embodiment) is described in the detail or more on the basis of the drawing.

Embodiment 1

Figure 2:
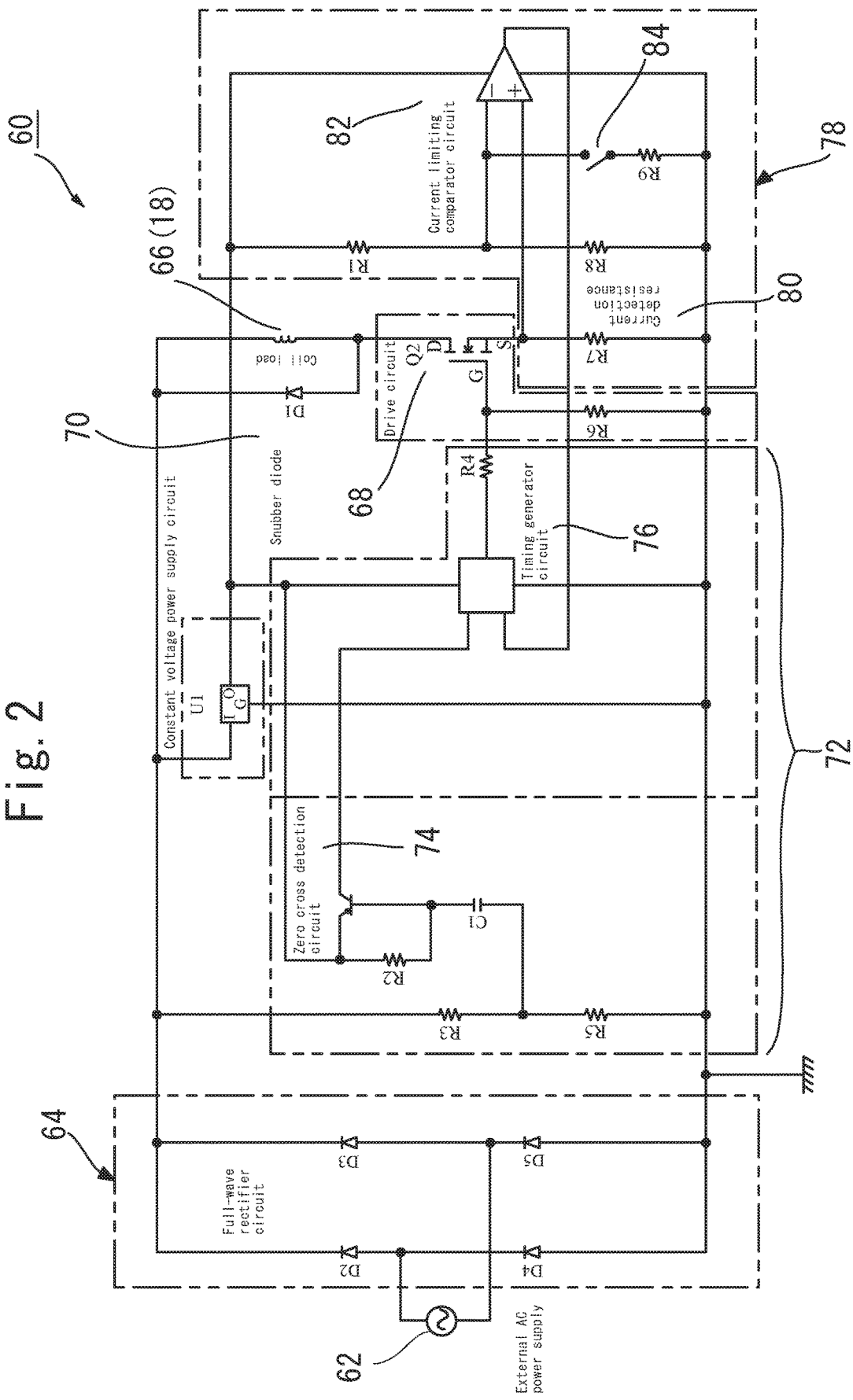
FIG. 2 is a circuit diagram of the solenoid valve driving control device of the invention.
Figure 3:
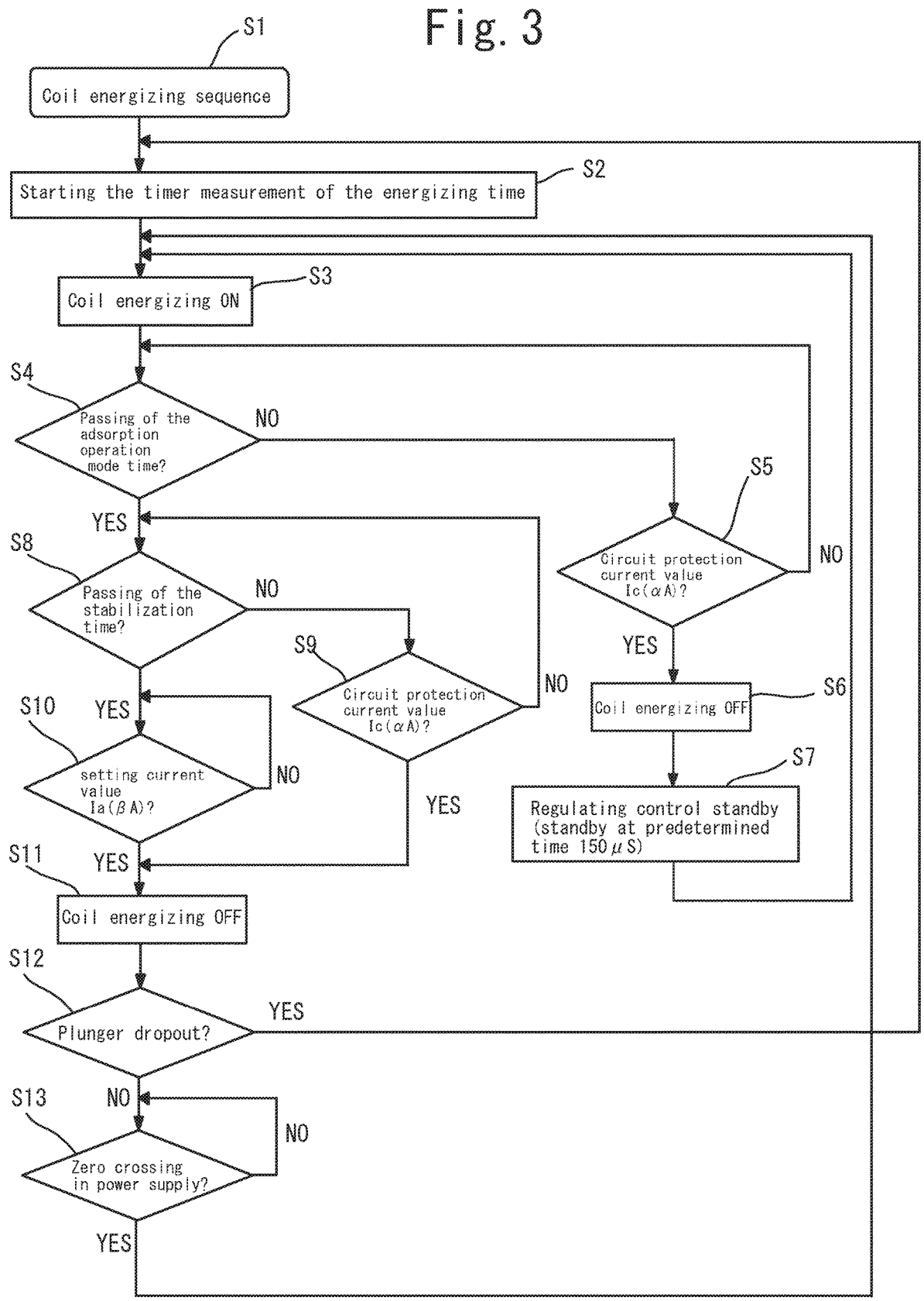
FIG. 3 is a flow chart that shows the control of the solenoid valve driving control device of the invention.
Figure 4:
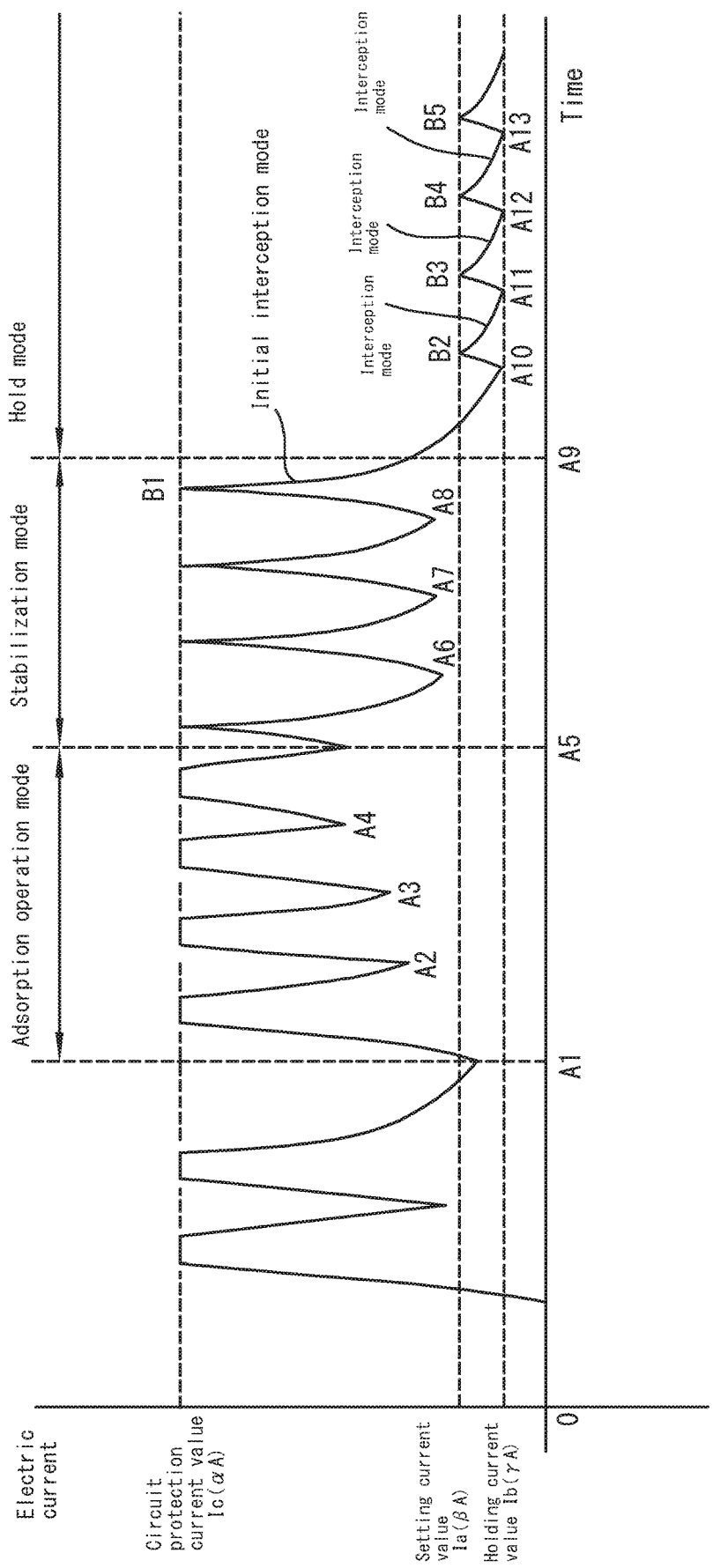
FIG. 4 is a schematic view that shows the control of the solenoid valve driving control device of the invention.

FIG. 1 is a longitudinal sectional view of the solenoid valve that applies the solenoid valve driving control device of the invention. FIG. 2 is a circuit diagram of the solenoid valve driving control device of the invention. FIG. 3 is a flow chart that shows the control of the solenoid valve driving control device of the invention. FIG. 4 is a schematic view that shows the control of the solenoid valve driving control device of the invention.

In FIG. 1, the reference numeral 10 shows the solenoid valve that applies the solenoid valve driving control device of the invention as a whole.

As shown in FIG. 1, a solenoid valve 10 is provided with a control unit 14 comprising a valve element 12.

Moreover, the control unit 14 of this solenoid valve 10 is provided with an electromagnetic coil 18 to which a driving portion 16 is passed through as shown in FIG. 1.

In addition, the electromagnetic coil 18 is provided with a bobbin 30 where the winding wire is rolled and as to surround the periphery of the bobbin 30, it is molded with a molding resin 22. In addition, as shown in FIG. 1, the electromagnetic coil 18 is provided in a magnetic frame 24, and fixed to the driving portion 16 by the magnetic frame 24.

That is, the driving portion 16 is passed through to a driving portion inserting through hole 28 formed to the center section of a base plate portion 26 of the magnetic frame 24 and a driving portion inserting through hole 32 of the bobbin 30. In addition, into a bolt inserting through hole 36 formed to the upper part of an attracting member 34 of the driving portion 16, a fastening bolt 42 is screwed together, through a bolt inserting through hole 40 formed to the center section of an upper plate portion 38 of the magnetic frame 24.

As a result, an electromagnetic coil 18 is passed through to the driving portion 16 and is fixed, so that a control unit 14 of the solenoid valve 10 is composed.

In addition, the driving portion 16 is provided with a plunger casing 44, and a plunger 46 in which the valve element 12 is fixed that can be moved upwardly and downwardly in this plunger casing 44. In addition, between the attracting member 34 and the plunger 46, the plunger 46 is urged downwardly, that is, an urging spring 50 that urges the valve element 12 in the direction of the valve seat 48 is disposed.

As for such solenoid valve 10, by applying the electric current to the electromagnetic coil 18, the plunger 46 is moved in the directions of the attracting member 34 against the urging spring 50. As a result, the valve element 12 connected with the plunger 46 is separated from the valve seat 48, so that a valve port 52 is opened.

Moreover, by interrupting application of the electric current to the electromagnetic coil 18, the plunger 46 is moved in the direction that separates from the attracting member 34 by the urging force of the urging spring 50. As a result, the valve element 12 connected with the plunger 46 is abutted to a valve seat 48, and the valve port 52 is closed.

Figure 14:
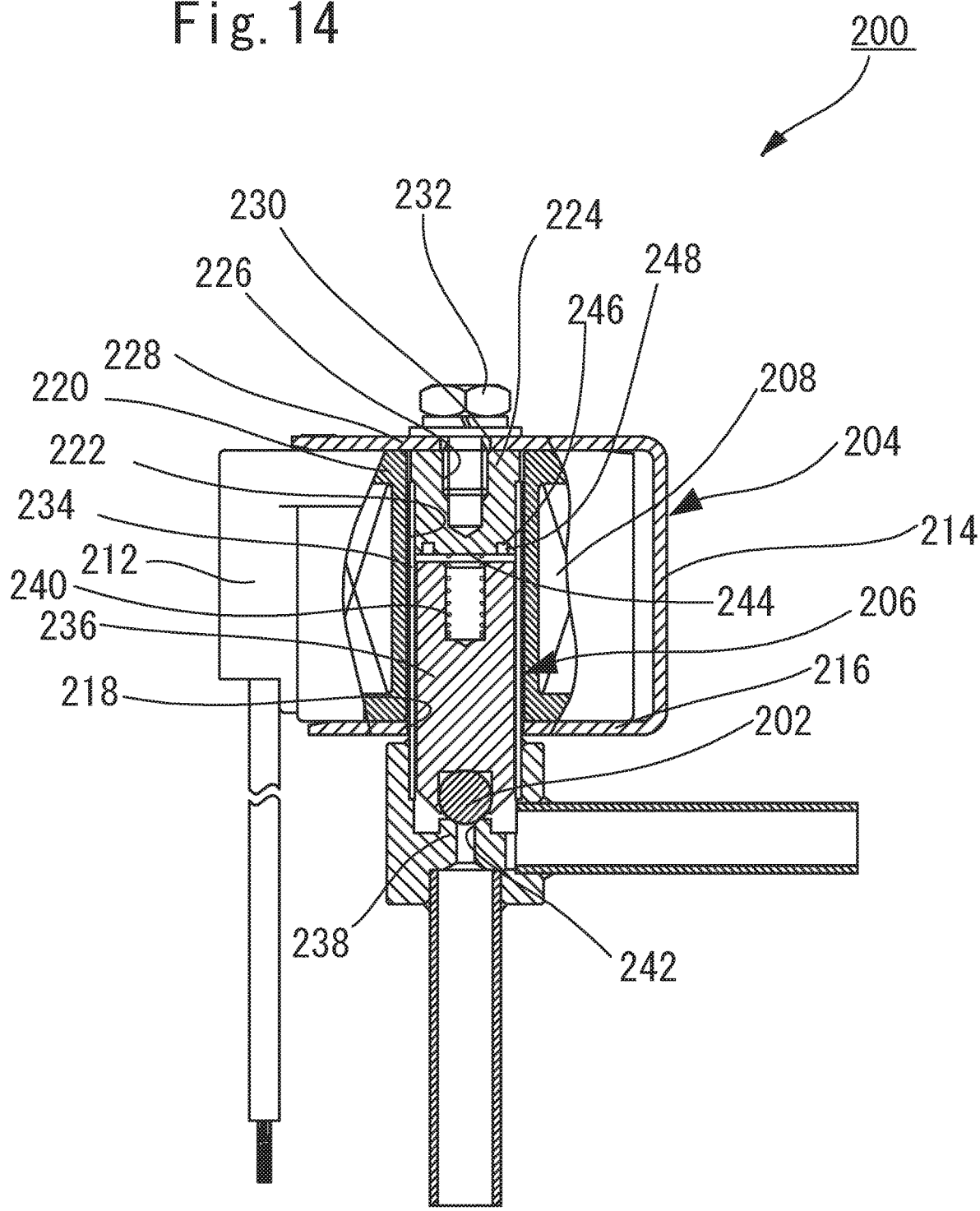
FIG. 14 is a longitudinal sectional view of the conventional solenoid valve.
Figure 15:
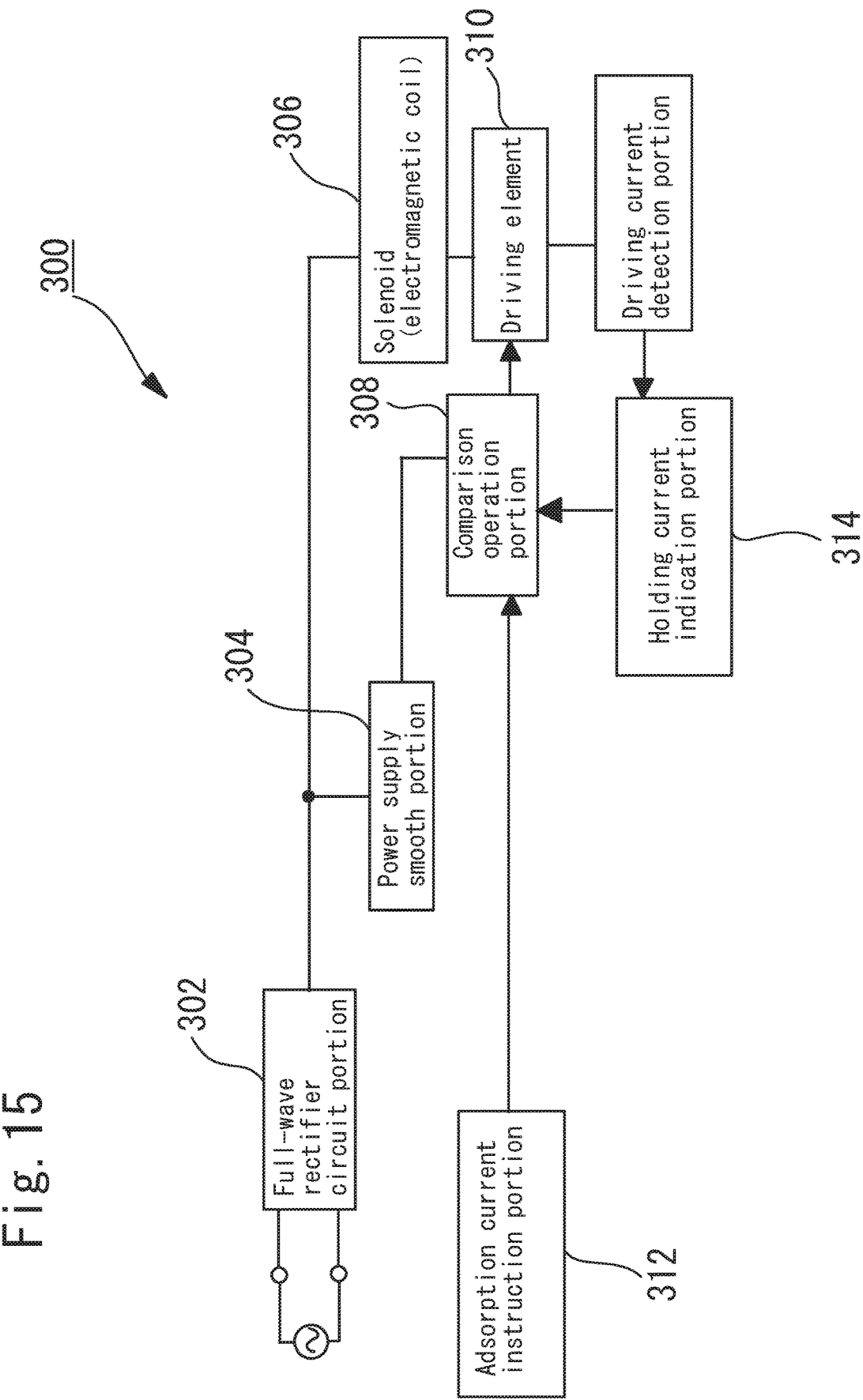
FIG. 15 is a block diagram of the conventional solenoid valve driving control device 300.
Figure 16:
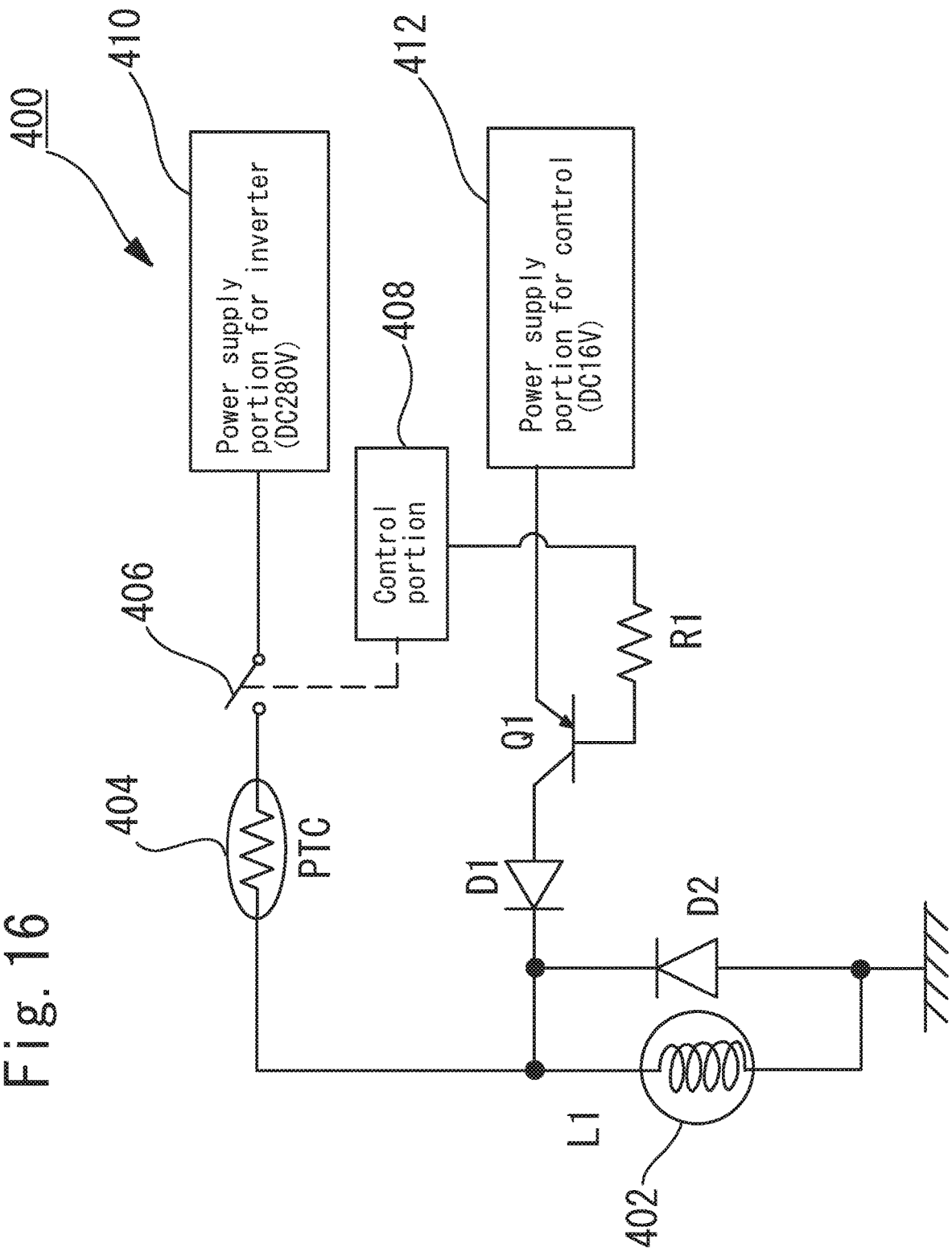
FIG. 16 is a block diagram of the conventional solenoid valve controller 400.

In addition, in the conventional solenoid valve 200 shown in FIG. 14, the annular shading off coil 248 (shading off ring) is provided in the attracting member 224. However, as shown in FIG. 1, in the solenoid valve 10 that applies the solenoid valve drive control device of the invention, in the attracting member 34 or plunge 46, it is the structure that such a shading off coil (shading off ring) is not provided.

FIG. 2 is a circuit diagram of the solenoid valve driving control device 60 of the invention. In this Embodiment, the Embodiment that controls the drive of solenoid valve 10 having such component is shown by using the ac power supply as one embodiment.

In addition, the solenoid valve drive control device 60 of the invention can be used in ac power supply and dc power supply (pulsating current). In case of the dc power supply, the full-wave rectifier circuit 64 described later may be omitted. The invention is characterized in that charging current in the stray capacity of the coil is not generated.

Therefore, for instance, in the predetermined voltage of 0V-20V or less, it is available that even if it is a dc power supply (for instance, rectangular wave and triangular wave) with the crossing timing.

The solenoid valve drive control device 60 of this Embodiment, for instance, effective voltage for commercial use: ac power supply 62 consisting of the monophase current power supply of 100V-240V is provided. In the alternating current from ac power supply 62, by a full-wave rectifier circuit 64 including the diode bridge, the full-wave rectification is performed.

As a result, the direct current is generated.

In addition, as shown in FIG. 2, the alternating current from this full-wave rectifier circuit 64 is applied to a solenoid 66 of the solenoid valve 10 (the electromagnetic coil 18). As a result, the solenoid 66 is driven. Consequently, the plunger 46 is moved in the directions of the attracting member 34 against an urging spring 50. As a result, the valve element 12 connected with the plunger 46 is separated from a valve seat 48, so that a valve port 52 is opened.

In this case, like this, the full wave is rectified with the full-wave rectifier circuit 64, and it is converted into direct current. As a result, in the solenoid valve 10, the shading off coil need not be provided to the attracting member 34 or plunger 46. Therefore, even if it is the same magnetic flux necessary to absorb the plunger 46, by omitting the shading off coil, the winding wire of the electromagnetic coil 18 of the solenoid 66 need not be extra rolled. As a result, the member and the processing man-hour can be reduced and the cost can be decreased.

Moreover, in the solenoid valve drive control device 60 of this Embodiment, as shown in FIG. 2, the electric current, in which the full wave is rectified by the full-wave rectifier circuit 64, is connected to one end of the solenoid 66 of the solenoid valve 10 as a plus side power supply.

Moreover, to the other end of the solenoid 66 of the solenoid valve 10, for instance, a switching means 68 such as MOSFET that provides and interrupts application of the electric current to the solenoid 66, is connected.

In addition, in the solenoid 66 of the solenoid valve 10, as an electric current return current member that returns to the solenoid 66 when application of the electric current is interrupted, for instance, a snubber circuit 70 that uses the diode is connected.

By component like this, for instance, by using the flywheel diode as an electric current return current member, for the period when application of the electric current to solenoid 66 is interrupted, an electric current can be passed thorough the solenoid 66 (i.e. electromagnetic coil 18). As a result, the plunger 46 can never vibrate, electricity can be discharged slowly, and energy can be held.

Moreover, in the solenoid valve drive control device 60, as shown in FIG. 2, as described later, a zero cross timing generation device 72, in which application of the electric current to the solenoid 66 by the switching device 68 is controlled, so that application of the electric current is started at zero cross timing during the power supply period of the monophase current power supply, is provided.

That is, as shown specifically in FIG. 2, this zero cross timing generation device 72 includes, a zero cross detection circuit 74 to detect zero crosses of the power supply period of the monophase current power supply, a timing generation circuit 76 that controls providing and interrupting application of the electric current to the solenoid 66 by the switching means 68.

This zero cross detection circuit 74 can use well-known zero cross detection circuit 74 besides the circuit shown in FIG. 2.

Moreover, the solenoid valve drive control device 60, as shown in FIG. 2, includes, an electric current sensing device 78, in which the current value that flows to the solenoid 66 is detected.

That is, as shown specifically in FIG. 2, this electric current sensing device 78 includes, a current detection resistance 80 (R7) in which current value that flows to solenoid 66 is detected, and an electric current limit comparator circuit 82 including comparator to detect predetermined electric current value Ia ($\beta$A) and circuit protection electric current value Ic ($\alpha$A) as described later.

As described later, in the electric current limit comparator circuit 82, after the attaching operation mode, by controlling of the zero cross timing generation device 72, after application of the electric current to the solenoid 66 is started at the zero cross timing by the switching device 68, when the current value that flows to the solenoid 66 detected by the electric current sensing device 78 reaches the circuit protection electric current value Ic ($\alpha$A), a stabilization mode that repeats the ON-OFF cycle plural times, in which application of the electric current to the solenoid 66 is interrupted by the switching means 84, is operated.

In the solenoid valve drive control device 60 component like this, it is controlled as shown in the flow chart shown in FIG. 3.

First of all, the initial mode is started as shown in FIG. 3 and FIG. 4. That is, as shown in FIG. 3, the sequence of electric current application to the coil is started in step S1. The timer measurement of the electric current application time is started in step S2.

In addition, as shown in FIG. 3, in step S3, electric current application to the coil is started. In addition, after application of the electric current to the solenoid 66 is started, when the current value that flows to the solenoid 66 detected by the electric current sensing device 78 reaches predetermined current value, i.e. the circuit protection electric current value Ic ($\alpha$A), by operating the constant electric current application set to the predetermined attachment current value, the attaching operation mode that adsorbs the plunger 46 is operated (A1-A4 in FIG. 4).

That is, in step S4 as shown in FIG. 3, it is determined whether the predetermined attaching operation mode time is passed or not.

In addition, in step S4 where it is determined that the predetermined attaching operation mode time is not passed, it proceeds to step S5 in FIG. 3, and it is determined whether it reaches the circuit protection electric current value Ic ($\alpha$A) that is the attachment current value or not.

In addition, in step S5, where it is determined that it reaches the circuit protection electric current value Ic ($\alpha$A), in step S6, application of the electric current to the solenoid 66 is interrupted by the switching means 84 (application of the electric current to coil OFF).

Next, in step S7, after the regulating control standby (predetermined time, for instance, 150 μS standby) is operated, it returns to step S3, and the coil energizing is started again.

On the other hand, in step S5, where it is determined that it does not reach the circuit protection electric current value Ic ($\alpha$A), it returns to step S4 and it is determined whether the predetermined attaching operation mode time is passed or not.

Thus, as shown in FIG. 4, after application of the electric current to the solenoid 66 is started at zero cross timing (A1 in FIG. 4), when the current value that flows to the solenoid 66 detected by the electric current sensing device 78 reaches predetermined current value, i.e. the circuit protection electric current value Ic (αA), by operating the constant electric current application set to the predetermined attachment current value, the attaching operation mode that attaches the plunger 46 is operated (A1-A4 in FIG. 4).

Moreover, in the attaching operation mode, after application of the electric current to solenoid 66 is started by switching means 68, when the current value that flows to the solenoid 66 detected by the electric current sensing device 78 reaches predetermined current value, i.e. the circuit protection electric current value Ic (αA), by operating the constant electric current application set to the predetermined attachment current value, the attachment of the plunger 46 is operated.

That is, in applying the electric current at the attaching mode, regardless of the control timing of the zero cross timing generation means 72, in order to terminate the attaching operation mode within the fixed time, the power supply is applied, and the time passage means is operated. As for the time passage means, for instance, the time passage means may be composed by the use of the microcomputer etc. In addition, it is composed that, after the lapse of the fixed time, that is, after the predetermined time passage of the attaching operation mode, the stabilization mode of the zero cross timing is started.

In this case, in the attaching operation mode, regardless of the control of the zero cross timing generation means 72, application of the electric current to the solenoid 66 may be started by the switching means 68. Moreover, application of the electric current to the solenoid 66 may be started along with the control of the zero cross timing generation means 72.

Like this, the solenoid valve driving control device 60 of the invention, comprises a circuit protection means, which interrupts application of the electric current to solenoid 66 by operating switching means 68 in regulation (150 μS), in the attaching operation mode when the current value that flows to the solenoid 66 detected by the electric current sensing device 78 reaches the predetermined electric current value Ic (αA) since the initial electric current application time when application of the electric current is started first That is, in the state that the plunger 46 is at first away from the attracting member 34 (i.e. state of no attaching), the small inductance (for instance, 0.2H) is revealed because the magnetic circuit is not made. On the other hand, in the state that the plunger 46 is attached to the attracting member 34, the magnetic circuit is formed in the solenoid 66, and inductance is increased (for instance, 2.5H).

71) Therefore, since first the coil winding has direct current resistance in about 2000, the electric current flows just that much. That is, the electric current of 1 A flows for instance if it is 200V. However, for instance, as for the switching device 68 such as MOSFET (Metal Oxide Semiconductor Field Effect Transistor), for instance, in case that the one, in which only about 0.5 A can be flowed, is used, there is a possibility that the circuit breaks. Therefore, if entering the state that it flows more than the predetermined circuit protection electric current value (0.5 A for instance), application of the electric current is interrupted and the circuit is safeguarded.

Thus, at the initial electric current application time, the inductance of the electromagnetic coil 18 of the solenoid 66 is small, so that heavy-current is flowed. As a result, the current interruption security function for the circuit protection may be provided. It is also possible to omit the current interruption protection function if MOSFET with large limit value of the electric current is used.

In addition, in step S4 where it is determined that the predetermined attaching operation mode time is passed, it moves to the stabilization mode (A5-A8 in FIG. 4).

That is, in FIG. 3, it proceeds to step S8, and it is determined whether the stabilization time is passed or not.

In step S8, where it is determined that the stabilization time is not passed, it proceeds to step S9. In step S9, it is determined whether it reaches the circuit protection electric current value Ic (αA) that is the attachment current value or not.

In addition, in step S9, where it is determined that it reaches the circuit protection electric current value Ic (αA) that is the attachment current value, it proceeds to step S11, and application of the electric current to the solenoid 66 is interrupted by the switching means 68 (application of the electric current to coil OFF).

On the other hand, in step S9, where it is determined that it does not reach the circuit protection electric current value Ic (αA) that is the attachment current value, it returns to step S8, and it is determined whether the stabilization time is passed or not.

Thus, the solenoid valve driving control device 60 of the invention, comprises the circuit protection means which interrupts application of the electric current by the switching means 84, when the current value that flows to the solenoid 66 detected by the electric current sensing device 78 reaches the predetermined electric current value Ic (αA), since application of the electric current to the solenoid 66 is started at zero cross timing.

In step S11, after application of the electric current to the solenoid 66 is interrupted, in the stabilization mode, it is determined whether the plunger 46 is dropped out from the attracting member 34 in step S2.

In step S12, where it is determined that the plunger 46 is not dropped out from the attracting member 34, it proceeds to step S13. In step S13, it is determined whether it is a zero cross at the power supply period of the monophase current power supply or not.

That is, as shown in FIG. 3, in step S13, in the zero cross detection circuit 74 of the zero cross timing generation device 72, the zero cross of the power supply period of the monophase current power supply is detected. Where it is determined that it is the zero cross of the power supply period of the monophase current power supply, it returns to step S3.

In addition, in step S3, by the timing generation circuit 76, as for application of the electric current to the solenoid 66 by the switching device 68, application of the electric current is started at the zero cross timing of the power supply period of the monophase current power supply (see A5-A8 in FIG. 4).

In this case, since the attaching operation mode time has already passed, in step S4, it is determined that the attaching operation mode time is passed. It proceeds to step S8, and it is determined whether the stabilization time is passed or not again. The above-mentioned step is repeated.

On the other hand, in step S13, where it is determined that it is not a zero cross at the power supply period of the monophase current power supply, again, in step S13, it is judged whether it is a zero cross at the power supply period of the monophase current power supply or not.

On the other hand, in step S9, where it is determined that it does not reach the circuit protection electric current value Ic (αA) that is the attachment current value, it returns to step S8, and it is judged whether the stabilization time is passed or not.

In addition, in step S12, where it is determined that the plunger 46 is dropped out from the attracting member 34, it is reset. It becomes a reabsorption mode, and the timer measurement of the electric current application time is started again in step S2.

As mentioned above, after the attaching operation mode, by controlling of the zero cross timing generation device 72, after application of the electric current to the solenoid 66 is started at the zero cross timing by the switching device 68, when the current value that flows to the solenoid 66 detected by the electric current sensing device 78 reaches the circuit protection electric current value Ic (αA), a stabilization mode that repeats the ON-OFF cycle plural times (four times of the total in the Embodiment of FIG. 4), in which application of the electric current to the solenoid 66 is interrupted by the switching means 84, is operated (see A5-A8 in FIG. 4).

This frequency is not especially limited, it may be set appropriately according to the viscosity of pressure and the liquid (gas), spring-loads, the fluid running away structures of the attaching surface, and the amounts of the lift of plunger 46 and the like, according to, for instance, the solenoid valve 10 that applies the solenoid valve driving control device 60 of the invention is used, In addition, in step S8, where it is determined that the stabilization time is passed, the stationary mode (power saving mode) is operated.

That is, in step S8, where it is determined that the stabilization time is passed (i.e. the stabilization mode is ended), as shown in FIG. 4, in the circuit protection electric current value Ic (αA) (B1 in FIG. 4), the initial interruption mode, in which application of the electric current to solenoid 66 is interrupted by the switching means 68, is operated.

In addition, after the initial interruption mode, as shown in FIG. 4, by controlling of the zero cross timing generation device 72, application of the electric current to the solenoid is started at zero cross timing (A10 in FIG. 4) by the switching device 84.

In addition, in the initial interruption mode, where the current value that flows to the solenoid detected by the electric current sensing device is larger than the predetermined electric current value Ia (βA) (A9 in FIG. 4), the electric current is not applied to the solenoid even if it becomes zero cross timing.

Next, it proceeds to step S10 in FIG. 3, it is determined whether the current value that flows to the solenoid 66 detected by the electric current sensing means 78 reaches the predetermined electric current value Ia (βA) or not (see FIG. 4).

That is, this predetermined electric current value Ia (βA) is the current value for holding attaching plunger 46 to the attracting member 34 after application of the electric current to the solenoid 66 is started at the zero cross timing.

Like this, the predetermined electric current value Ia (βA) is the current value for holding attaching plunger 46 to the attracting member 34 after application of the electric current to the solenoid 66 is started at the zero cross timing. Therefore, since an extra electric current is never applied to the solenoid 66, the energy conservation can be achieved.

In addition, in step S10 in FIG. 2, and FIG. 3, where (when) it is determined that the current value that flows to the solenoid 66 reaches the predetermined electric current value Ia (βA), it proceeds to step S11. It moves to the interruption mode in which application of the electric current to the solenoid 66 is interrupted by the switching means 68 (see B2-B5 in FIG. 4).

On the other hand, in step S10, it is determined that the current value that flows to the solenoid 66 does not reach the predetermined electric current value Ia (βA), it returns to step S10 again. Then, it is determined whether the current value that flows to the solenoid 66 detected by the electric current sensing means 78 reaches the predetermined electric current value Ia (βA) or not.

In addition, in step S11, after it moves to the interruption mode in which application of the electric current to the solenoid 66 is interrupted by the switching means 68, in the stationary mode (power saving mode), in step S12, it is determined whether the plunger 46 is dropped out from the attracting member 34 or not.

In step S12, where it is determined that the plunger 46 is not dropped out from the attracting member 34, it proceeds to step S13. In step S13, it is determined whether it is a zero cross of the power supply period of the monophase current power supply or not.

That is, as shown in FIG. 3, in step S13, in the zero cross detection circuit 74 of the zero cross timing generation device 72, the zero cross of the power supply period of the monophase current power supply is detected. Where it is determined that it is the zero cross of the power supply period of the monophase current power supply, it returns to step S3. Moreover, by the timing generation circuit 76, as for application of the electric current to the solenoid 66 by the switching device 68, application of the electric current is started at the zero cross timing of the power supply period of the monophase current power supply (see A11-A13 in FIG. 4).

In this case, since the initial electric current application time has already passed, in step S4, it is determined that the initial electric current application time is passed. Moreover, the stabilization time has already passed. Therefore, in step S8, it is determined that the stabilization time is passed. In addition, in step S10, whether the current value that flows to the solenoid 66 reaches the predetermined electric current value Ia (βA) or not is determined again. The above-mentioned step is repeated.

On the other hand, in step S13, it is determined that it is not the zero cross at the power supply period of the monophase current power supply, in step S13, it is determined again whether it is a zero cross at the power supply period of the monophase current power supply or not.

In addition, in step S12, where it is determined that the plunger 46 is dropped out from the attracting member 34, it is reset. As a result, it becomes the reabsorption mode, and the timer measurement of the electric current application time is started again in step S2.

Hereafter, step S8 and step S10-step S13 are repeated.
It moves to the hold mode (stationary mode) as shown in FIG. 4.

In this case, as shown in FIG. 4, after interrupting application of the electric current to the solenoid 66 by the switching device 68, the holding power is generated by discharging the energy that accumulated in the solenoid 66 between the following zero cross timings through a snubber circuit 70, the hold mode, in which the current value that flows to the solenoid is set to reach the predetermined holding electric current value Ib (γA) or more, is sustained.

That is, this holding electric current value Ib (γA) is a current value in which the state that the plunger 46 adsorbs the attracting member 34 can be held. The value of the holding electric current value Ib (TA) is set a value larger than the predetermined dropout detection electric current value Id (δA) described later, and is set a value smaller than the predetermined electric current value Ia (βA).

Like this, this holding electric current value Ib (γA) is a current value in which the state that the plunger 46 adsorbs the attracting member 34 can be held. As a result, the plunger 46 can be kept attract to the attracting member 34 in the state of the absorption (state of an open valve), so that the dropout in which the plunger 46 is separated from the state of attaching to the attracting member 34 can be avoided.

In the solenoid valve driving control device 60 of the invention component like this, application of the electric current to the solenoid 66 by the switching device 68 is controlled by the zero cross timing generation device 72 so that application of the electric current is started at the zero cross timing at the power supply period of the monophase current power supply.

As a result, inrush current to the stray capacity of the coil can be controlled. The generation of the noise can be controlled by so-called "Off phase control" by adjusting inrush current to the stray capacity of the coil to zero, and by accumulating energy in the electromagnetic coil 18 of the solenoid 66.

Moreover, when the power-supply voltage is 20V or less, inrush current to the stray capacity of the coil doesn't reach the value that exceeds the limit value of EMC standard, and the energy conservation can be attained.

In addition, in the interruption mode, by controlling of the zero cross timing generation device 72, after application of the electric current to the solenoid 66 is started at zero cross timing by the switching device 68, when the current value that flows to the solenoid 66 detected by the electric current sensing device 78 reaches the predetermined electric current value Ia (βA), application of the electric current to the solenoid 66 is interrupted by the switching device 68.

Moreover, in the hold mode, after interrupting application of the electric current to the solenoid 66 by the switching device 68, the holding power is generated by discharging the energy that accumulated in the solenoid 66 between the following zero cross timings through the snubber circuit 70, the current value that flows to the solenoid 66 is set to reach the predetermined holding current value Ib (γA) or more.

As a result, the holding power is generated by discharging the energy that accumulated in the solenoid 66 between the following zero cross timings through the snubber circuit 70, the current value that flows to the solenoid 66 is set to reach the predetermined holding electric current value Ib (γA) or more.

Therefore, after interrupting application of the electric current to the solenoid 66, in order that it is not the predetermined holding current value Ib (γA) or less, for instance, the circuit is switched to the snubber circuit that uses the diode. As a result, electricity is slowly discharged so that the plunger 46 can be kept attract to the attracting member 34 in the state of the absorption (state of an open valve). The energy conservation can be achieved.

Thus, the solenoid valve drive control device 60, in which it is possible to be used in the alternating-current power supply voltage (Effective voltage: 100 Vac-240 Vac), and in which the generation of the noise that originates in inrush current can be controlled by reducing inrush current to the stray capacity of the coil and accumulating energy in the coil, and in which the energy conservation can be attained, can be provided.

Figure 6:
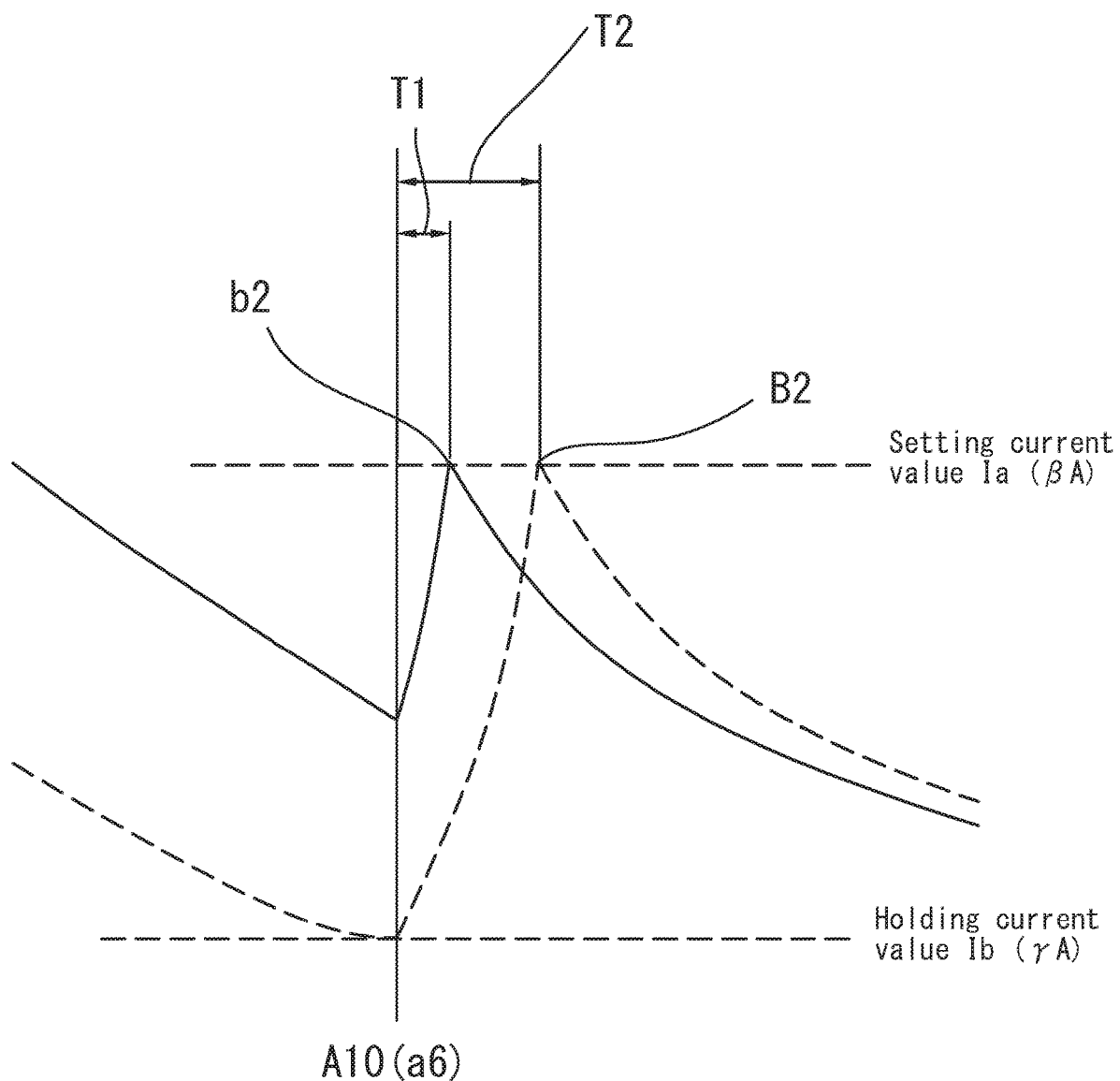
FIG. 6 is an enlarged view in A part in FIG. 5.
Figure 17:
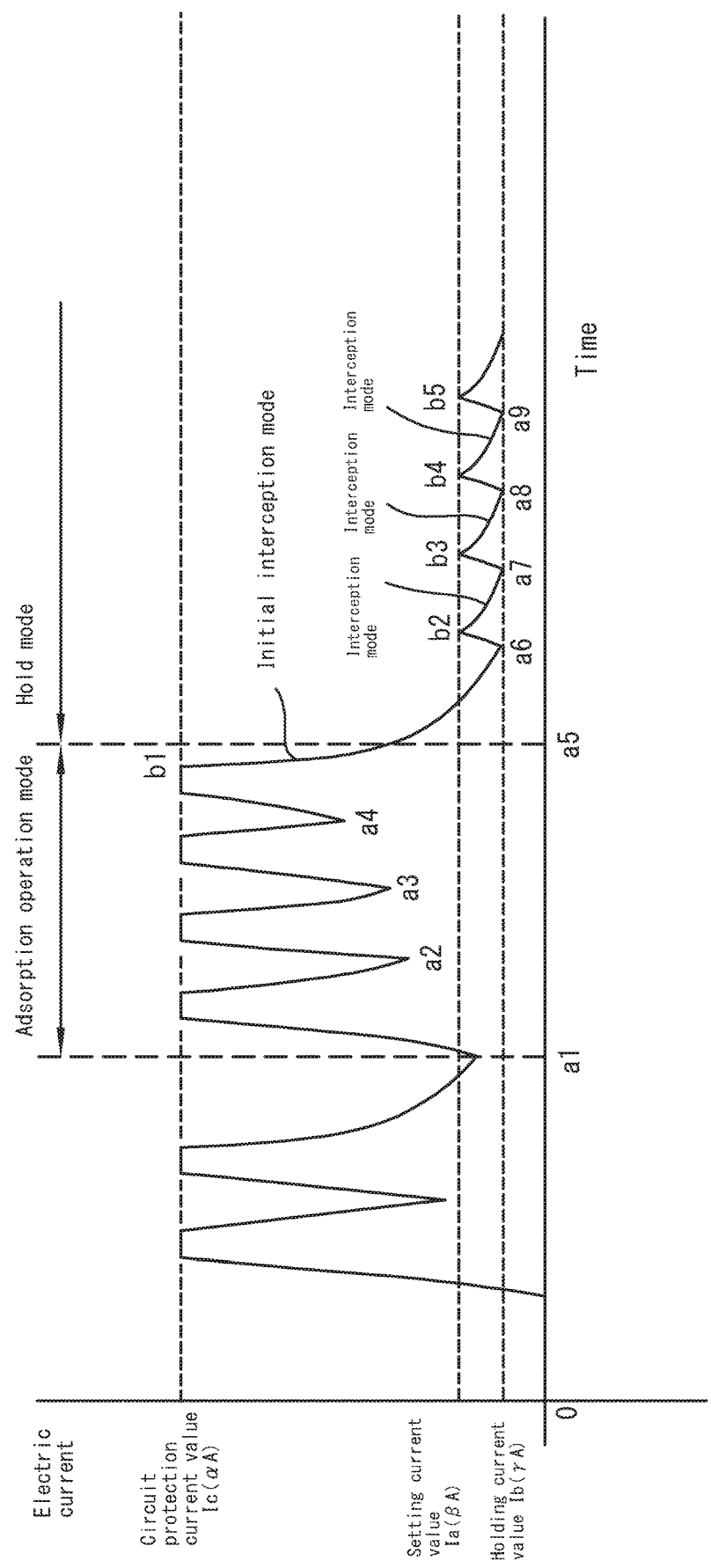
FIG. 17 is a graph where the relation between time and the electric current when the stabilization mode of the present invention is not operated is shown.

By the way, as mentioned above, the stabilization mode is not operated, as shown in FIG. 17 and the enlarged view of FIG. 6, the lower limit of the electric current is not decreased sufficiently at the following zero cross timing (a6 in FIG. 17). As a result, there is a case that a high current value, in which it is higher than the holding electric current value Ib (γA), is generated.

As a result, after application of the electric current begins at zero cross timing (a6 in FIG. 17), time T1 (b2 in FIG. 17) in which the current value flowed to the solenoid reaches the predetermined electric current value Ia (βA) becomes short.

Therefore, since time T1 (b2 in FIG. 17) in which the current value flowed to the solenoid reaches the predetermined electric current value Ia (βA) becomes short, it will be determined by mistake as the dropout.

Therefore, though the magnetic path is normally composed (i.e. the plunger is attached to the attracting member), it might be a case that it is determined by mistake as the dropout, and it is entered into the reabsorption mode of the plunger.

Moreover, since the current waveform is not stable like this, as for the current value that flows to the solenoid, in the interruption mode that interrupts application of the electric current to the solenoid, the dispersion might be caused in the residual current value by zero cross that arrive after it falls below the predetermined electric current value Ia (βA).

That is, the problem is caused in which the optimum control cannot be done by being determined according to the product as the state of release.

Figure 5:
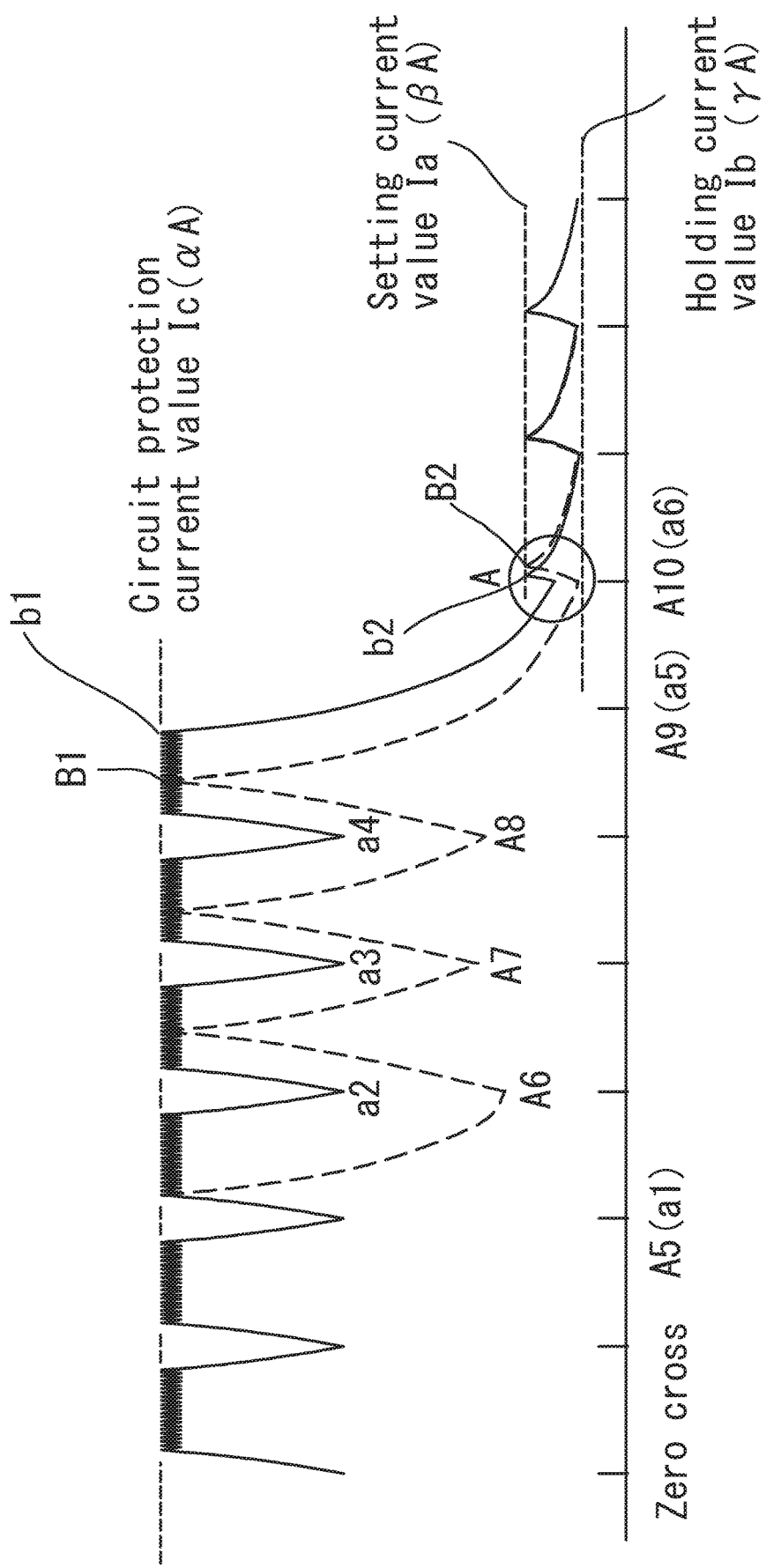
FIG. 5 is a graph where the relation between overlapped time and electric current is shown for convenience' sake in the initial interruption mode for the sake of comparison between the solenoid valve driving control device 60 of the present invention and a case in which the stabilization mode is not operated.

FIG. 5 is a graph where the relation between overlapped time and electric current is shown for convenience' sake in the initial interruption mode for the sake of comparison between the solenoid valve driving control device 60 of the present invention and a case in which the stabilization mode is not operated. FIG. 6 is an enlarged view in A part in FIG. 5.

In Addition, the graph of FIG. 5 is the graph in the state that the plunger is attached in the attaching operation mode and residual magnetic flux density B is saturated after the full-wave rectification is repeatedly put. Moreover, it is a graph in which assuming that inductance L of the magnetic path circuit is converged and it is a definite value, and the advance and the fall speed (time constant) of the current waveform are constant.

That is, as shown in FIG. 5, in case that the stabilization mode (solid line) is not operated, as described in FIG. 17, in the attaching operation mode (time to the attaching operation mode time is passed). There is a phenomenon in which the lower limit of the electric current is gradually increased (to a2-a4 in FIG. 17). In addition, in FIG. 5, the lower bound of the electric current is shown high for convenience' sake constantly.

On the contrary, in the solenoid valve driving control device 60 of the present invention, after the attaching operation mode, by controlling of the zero cross timing generation device 72, after application of the electric current to the solenoid is started at zero cross timing by the switching device 68, when the current value that flows to the solenoid 66 detected by the electric current sensing device 78 reaches the circuit protection electric current value Ic (αA), a stabilization mode that repeats the ON-OFF cycle plural times (four times of the total in the Embodiment of FIG. 4), in which application of the electric current to the solenoid 66 is interrupted by the switching means 84, is operated (see A5-A8 in FIG. 4).

That is, as shown in the dotted line of FIG. 5, when the current value that flows to the solenoid 66 detected by the electric current sensing device 78 reaches the circuit protection electric current value Ic (αA), a stabilization mode that repeats the ON-OFF cycle plural times (four times of FIG. 5), in which application of the electric current to the solenoid 66 is interrupted by the switching means 84, is operated.

Therefore, in the solenoid valve driving control device 60 of the present invention as shown in the dotted line of FIG. 5, in the stabilization mode after the attaching operation mode (time to the attaching operation mode time is passed), inductance L is constant and the lower limit of the electric current is stable without the increase thereof.

On the contrary, in case that the stabilization mode is not operated, as shown by the solid line of FIG. 5 and FIG. 6, after the initial interruption mode, as shown in FIG. 17 and the enlarged view of FIG. 6, the lower limit of the electric current is not decreased sufficiently at the following zero cross timing (a6 in FIG. 17). As a result, a state, in which it is higher than the holding electric current value Ib ($\gamma$A), is generated.

As a result, as shown by the solid line of FIG. 5 and FIG. 6, after application of the electric current begins at zero cross timing (a6 in FIG. 6), time T1 (b2 in FIG. 6) in which the current value flowed to the solenoid reaches the predetermined electric current value Ia ($\beta$A) becomes short.

Thus, since time T1 (b2 in FIG. 6) to reaching to the predetermined current value Ia ($\beta$A) becomes short, it will be determined by mistake as the dropout.

Therefore, though the magnetic path is normally composed (i.e. the plunger is attached to the attracting member), it might be a case that it is determined by mistake as the dropout, and it is entered into the reabsorption mode of the plunger.

Moreover, since the current waveform is not stable like this, as for the current value that flows to the solenoid, in the interruption mode that interrupts application of the electric current to the solenoid, the dispersion might be caused in the residual current value by zero cross that arrive after it falls below the predetermined electric current value Ia ($\beta$A).

That is, the problem is caused in which the optimum control cannot be done by being determined according to the product as the state of release.

On the contrary, in the solenoid valve driving control device 60 of the present invention, as shown in the dotted line of FIG. 5 and FIG. 6, after the initial interruption mode, the lower limit of the electric current is decreased sufficiently at the following zero cross timing, so that it can control within the range of the predetermined holding current value Ib ($\gamma$A).

As a result, as shown in the dotted line of FIG. 5 and FIG. 6, after application of the electric current is started at the zero cross timing, time T2, in which the current value flowed to the solenoid 66 reaches the predetermined electric current value Ia ($\beta$A), can be stabilized without shortening.

As a result, after application of the electric current begins at zero cross timing, in case that the presence of the dropout is detected by the size at time T to reaching the current value that flows to the solenoid 66 to the predetermined electric current value Ia ($\beta$A), it is not determined by mistake as the dropout.

Therefore, though the magnetic path is normally composed (i.e. the plunger 46 is attached to the attracting member 34), it would not be determined by mistake as the dropout, and it is never entered into the reabsorption mode of the plunger 46.

Moreover, since the current waveform is stable like this, as for the current value that flows to the solenoid 66, in the interruption mode that interrupts application of the electric current to the solenoid 66, the dispersion is not caused in the residual current value by zero cross that arrive after it falls below the predetermined electric current value Ia ($\beta$A) and it can be controlled within the constant range.

As a result, the optimum control can be operated since it is not determined according to the product as the state of release.

By the way, the following two methods can be adopted in step S12 as a method of determining whether the plunger 46 is dropped out from the attracting member 34 or not.

That is, as a first dropout detection method, in the dropout sensing device, the time, from the time when application of the electric current to the solenoid 66 is started at the zero cross timing, to the time when the current value that flows to the solenoid 66 detected by the electric current sensing means 78 reaches the predetermined electric current value Ia ($\beta$A), is measured, and the dropout is detected by determining whether it is predetermined dropout detection time or not.

As mentioned above, in the interruption mode, when the current value that flows to the solenoid 66 detected by the electric current sensing device 78 reaches the predetermined electric current value Ia ($\beta$A), the application of the electric current to the solenoid 66 is interrupted by the switching device 68.

Therefore, the required time t2 is from the time that application of the electric current is interrupted from the state that the plunger 46 adsorbs the attracting member 34 (in case of high inductance), to the time to reach the predetermined electric current value Ia ($\beta$A). Moreover, the required time t1 is from the time of the state that the plunger is dropped out (in case of low inductance), to the time to reach the predetermined electric current value Ia ($\beta$A). In this case, by the influence of the electromagnetic coil of charge time, in the state that the plunger 46 is dropped out (in case of low inductance), compared with the state that plunger 46 adsorbs the attracting member 34 (i.e. high inductance), the electric current application time required for this charge (predetermined dropout detection time) is short.

The time required for this charge is measured, and the time (predetermined dropout detection time) required for the charge that becomes a threshold is decided. Consequently, whether the plunger 46 is dropped out or not can be determined. That is, the time, from the time when application of the electric current to the solenoid 66 is started at the zero cross timing, to the time when the current value, which flows in the solenoid 66 detected by the electric current sensing device 78 reaches the predetermined electric current value Ia ($\beta$A), may be measured. Consequently, whether it is the predetermined dropout detection time or less may be determined and the dropout may be detected.

As a result, the dropout, in which the plunger 46 is separated from the state of attaching to the attracting member 34, is detected by the dropout sensing device. Consequently, again application of the electric current to the solenoid 66 is started, so that the dropout, in which the plunger 46 is separated from the state of attaching to the attracting member 34, can be avoided. As a result, operation and the reliability are improved.

In this case, since there is a power-supply voltage dependency at charge time, the determination value at the electric connection time should be changed by the power-supply voltage.

That is, charge time is changed depending on the coil and the power-supply voltage and time shortens when the power-supply voltage is large. Therefore, for this purpose, for instance, by whether it is a voltage that is higher voltage or lower voltage than 110V, it should detect whether the time that application of the electric current to the solenoid 66 is short or long. That is, the determination time should be shortened in a high power-supply voltage to compare this.

Figure 7:
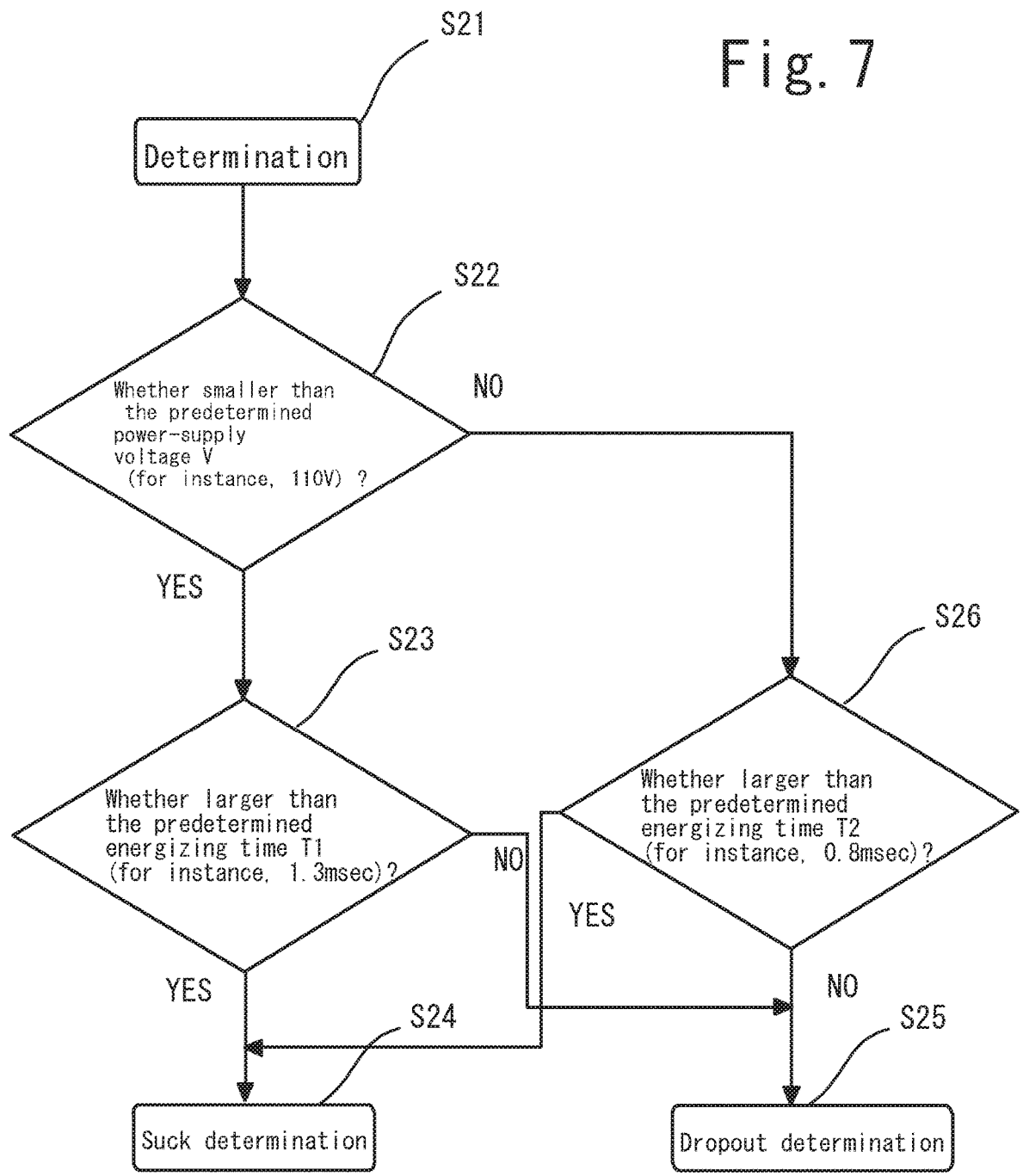
FIG. 7 is a flow chart that shows the control of the solenoid valve driving control device of the invention.

Therefore, for instance, it may control like the flow chart shown in FIG. 7.

That is, the determination is started in step S21. In addition, in step S22, it is determined whether the power-supply voltage is smaller than the predetermined power-supply voltage V (for instance, 110V) or not.

In addition, in step S22, where it is determined that the power-supply voltage is smaller than the predetermined power-supply voltage V (for instance, 110V), in step S23, it is determined whether the electric current application time is larger than the predetermined electric current application time T1 (for instance, 1.3 msec) or not.

In addition, in step S23, where it is determined that the electric current application time is larger than the predetermined electric current application time T1 (for instance, 1.3 msec), in step S24, it is the state that the plunger 46 is attached to the attracting member 34, so that the suck determination is performed.

On the other hand, in step S23, where it is determined that the electric current application time is smaller than the predetermined electric current application time T1 (for instance, 1.3 msec), in step S25, it is the state that the plunger 46 is dropped put from the attracting member 34, so that the dropout determination is performed.

Moreover, in step S22, where it is determined that the power-supply voltage is larger than the predetermined power-supply voltage V (for instance, 110V), in step S26, it is determined whether the electric current application time is larger than the predetermined electric current application time T2 (for instance, 0.8 msec) or not.

In addition, in step S26, where it is determined that the electric current application time is larger than the predetermined electric current application time T2 (for instance, 0.8 msec), in step S24, it is the state that the plunger 46 is attached to the attracting member 34, so that the determination of sucking is performed.

On the other hand, in step S26, where it is determined that the electric current application time is smaller than the predetermined electric current application time T2 (for instance, 0.8 msec), in step S25, it is the state that the plunger 46 is dropped put from the attracting member 34, so that the dropout determination is performed.

In addition, as for these predetermined power-supply voltage V, predetermined electric current application time T1, and predetermined electric current application time T2, etc., they are previously measured and determined, so that they are made to the data base, and they may be memorized in the storage portion, and they may be used.

Moreover, as a second dropout detection method, it may be used that, in the dropout sensing means, a current value when application of the electric current to the solenoid 66 is started at the zero cross timing is measured by an electric current sensing device 78, and whether it is the predetermined dropout detection electric current value Id (δA) or less is determined and the dropout is detected.

Like this, a current value when application of the electric current to the solenoid 66 is started at the zero cross timing is measured by the electric current sensing device 78, and whether it is the predetermined dropout detection electric current value Id (δA) or less is determined and the dropout is detected.

That is, this as indication (the predetermined dropout detection electric current value Id (δA)), the current value when application of the electric current to the solenoid 66 is started at the zero cross timing is measured by the electric current sensing device 78. Consequently, whether it is the predetermined dropout detection electric current value Id (δA) or less may be determined and the dropout may be detected.

As a result, the dropout, in which the plunger 46 is separated from the state of attaching to the attracting member 34 by the dropout sensing device, is detected. Furthermore, application of the electric current to the solenoid 66 is started again, so that the dropout in which the plunger 46 is separated from the state of attaching to the attracting member 34 can be avoided, and operation and the reliability are improved.

In addition, as for electric current equation that flows to coil when power-supply voltage in which full wave is rectified is applied, the summary is simply described as follows.

Where each constant is defined, it is as follows.

Here,

Em: Crest value of power-supply voltage in which full wave is rectified,

R: Coil resistance,

L: Coil inductance, f: Frequency of commercial power,

ω: Angular frequency of commercial power.

t: Period of power-supply voltage in which full wave is rectified.

In this case, $\omega = 2\pi f, t = 1/(2f)$

T=t1+t2=t3+t4=t5+t6 (t1, t3, t5, . . . : electric current application time, and t2, t4, t6, . . . : electrical discharge time).

$Z(\text{Synthesis impedance}) = \sqrt{R^2 + (\omega L)^2}, \tau = R/L, \text{Power-factor } \phi = \cos\theta = R/Z$ [Equation 1]

The circuit equation is set up and where the electric current general form at charge to inductance is solved by the full-wave rectification, it can be indicated by the following equation.

[Equation 2]

$$I(t) = \frac{Em}{Z}\sin(\omega t)(1 - e^{-\tau t}) + I(t0) \quad (1)$$

Moreover, where the electric current general form when electricity is discharged throwing into the snubber diode is solved, it can be indicated by the following equation.

[Equation 3]

$$I(t) = I(t1)(e^{-\tau t}) \quad (2)$$

If the calculation is repeatedly advanced, it becomes the following.

The starting value when application of the electric current is I (t0)=0.

The time when the charge ended is t1.

In this case, electric current I1 when the charge is completed is the following equation from the expression (1).

[Equation 4]

$$I1 = \frac{Em}{Z}\sin(\omega t1)(1 - e^{-\tau t1}) + 0 \quad (3)$$

As for the electrical discharge equation of the first time, if the time when the electrical discharge is completed is t2, electric current I2, when the electrical discharge is completed, is determined by the following equation by the equation (2).

[Equation 5]

$$I2 = I1(e^{-\tau(t2-t1)}) \quad (4)$$

As for the charge completion electric current I3 of the second times, it is determined by superposing of the electric current. Where the time when the electrical discharge is completed is t3, it is determined as the following equation by the equation (1).

[Equation 6]

$$I3 = \frac{Em}{Z}\sin(\omega(t3-t2))(1 - e^{-\tau(t3-t2)}) + I2 \quad (5)$$

As for the electrical discharge expression of the second times, where the time when the electrical discharge is completed is t4, the electrical current I4, when the electrical discharge is completed, is determined as the following equation by the equation (1).

[Equation 7]

$$I4 = I3(e^{-\tau(t4-t3)}) \quad (6)$$

Where calculating it as mentioned above repeatedly, charging current In of times X can be indicated by the following equation.

$$X = (n+1)/2$$

[Equation 8]

$$In = \frac{Em}{Z}\sin(\omega(tn - t(n-1)))(1 - e^{-\tau(tn-t(n-1))}) + I(n-1) \quad (7)$$

In this case, n=3, 5, 7, 9 . . . .

Discharge current In of times Y can be shown by the following equation.

$$Y = n/2$$

[Equation 9]

$$In = I(n-1)(e^{-\tau(tn-t(n-1))}) \quad (8)$$

In this case, n=4, 6, 8, 10, . . . .

Figure 8:
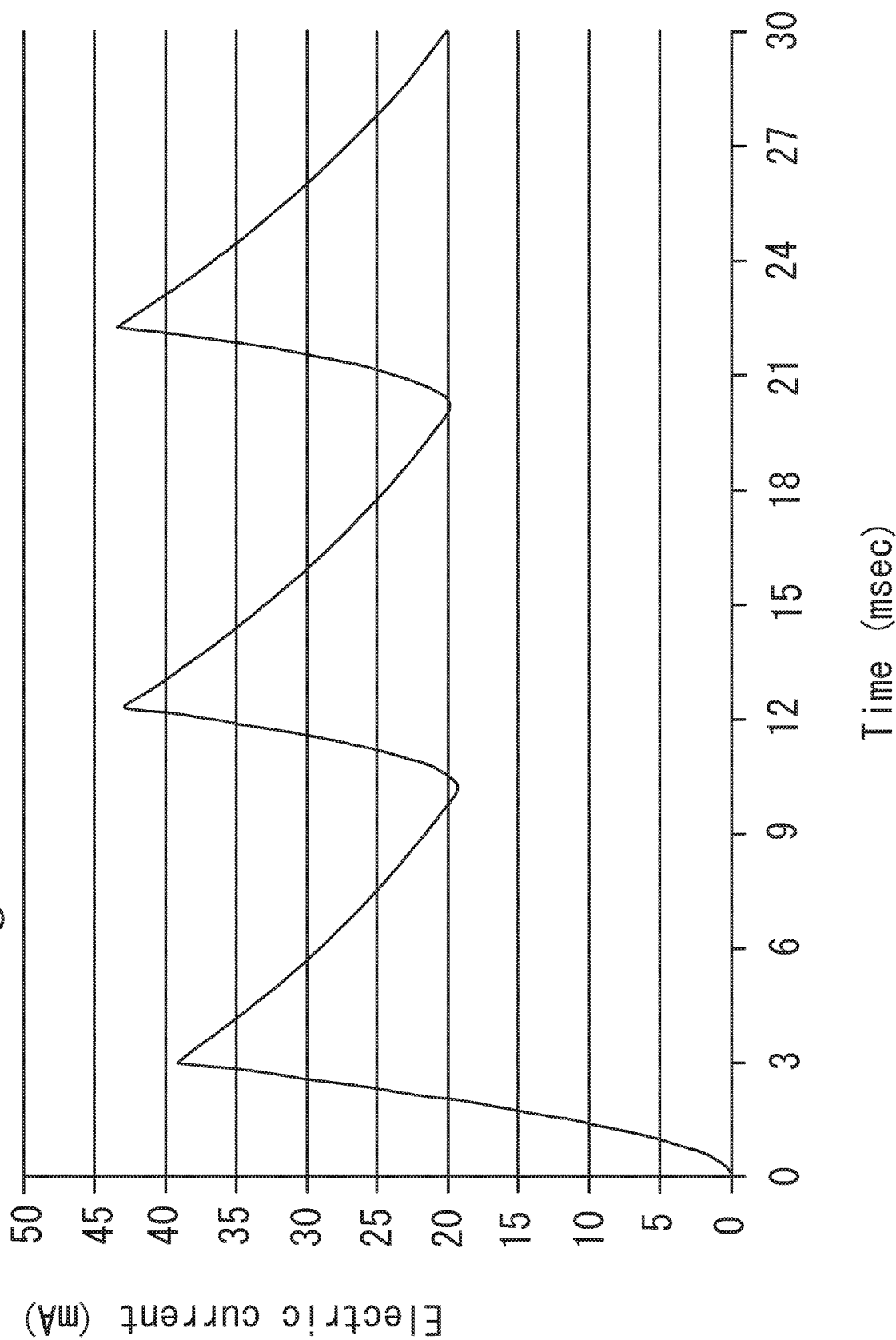
FIG. 8 is a graph where the relation between time and the electric current in the stationary mode (power saving mode) based on the relational expression of the charge and the electrical discharge is shown.

As mentioned above, the relational equation between the electrical charge and the electrical discharge can be indicated. FIG. 8 is a graph where the relation between time and the electric current in the stationary mode (power saving mode) based on the relational expression of the charge and the electrical discharge is shown. That is, in FIG. 8, as one example, the calculation result at R=230 (Ω), L=2.3 (H), Em=141.4 (V), f=−50 (Hz), charge time ton=2.23 (msec), and electrical discharge time toff=7.77 (msec) is indicated.

As understood from FIG. 8, in the stationary mode (power saving mode), the current waveform is stable. In addition, as for this current waveform, the example, in which, the charge is stopped at the predetermined electric current value Ia, and switching the mode is switched from the electrical discharge to the charge at the timing of the zero cross, is shown. Moreover, the charge time and the electrical discharge time indicated after the second times of the charge time and the electrical discharge time are indicated.

Embodiment 2

Figure 9:
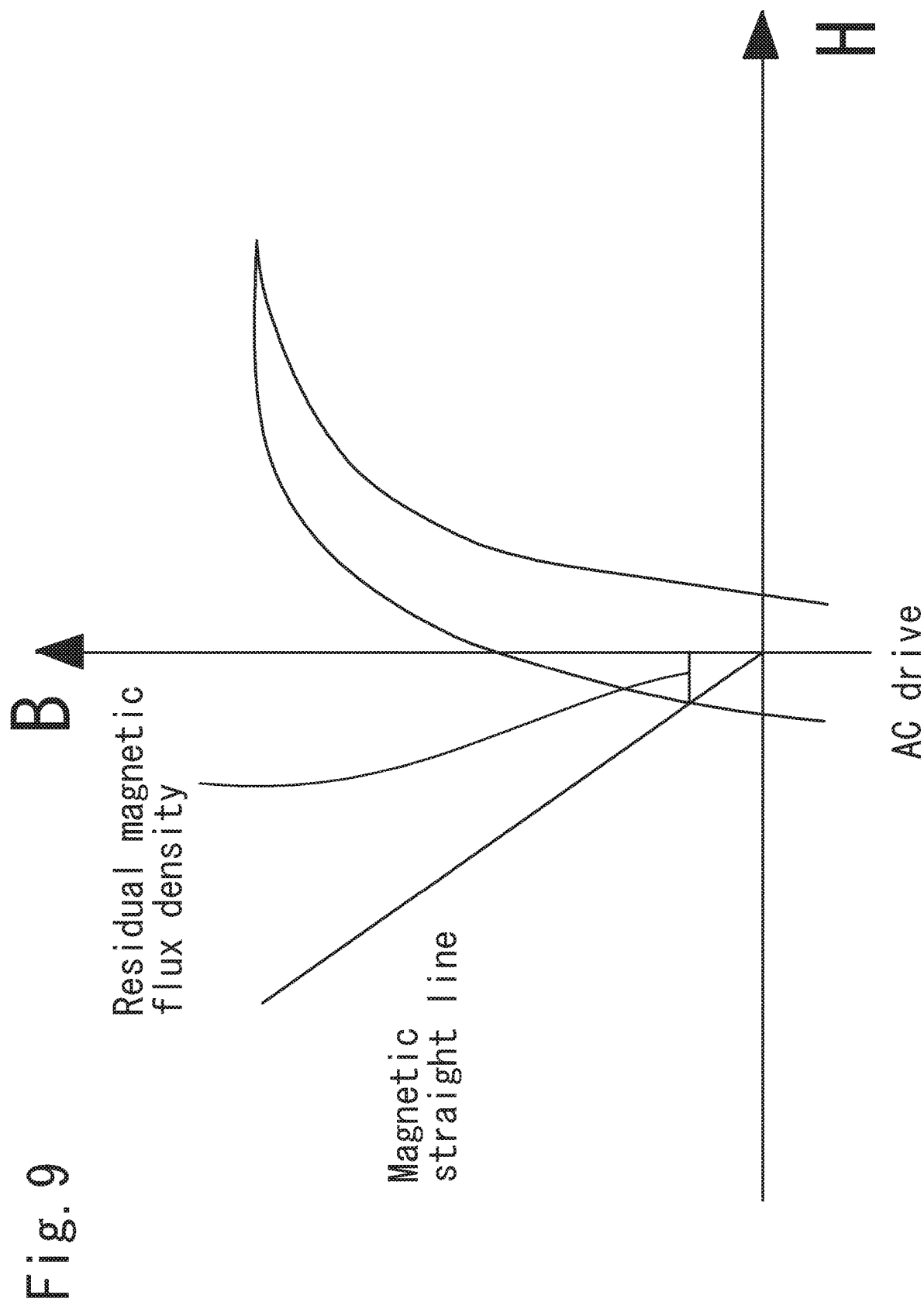
FIG. 9 is a graph where the relation of B-H when exchange (AC) is driven is shown.
Figure 10:
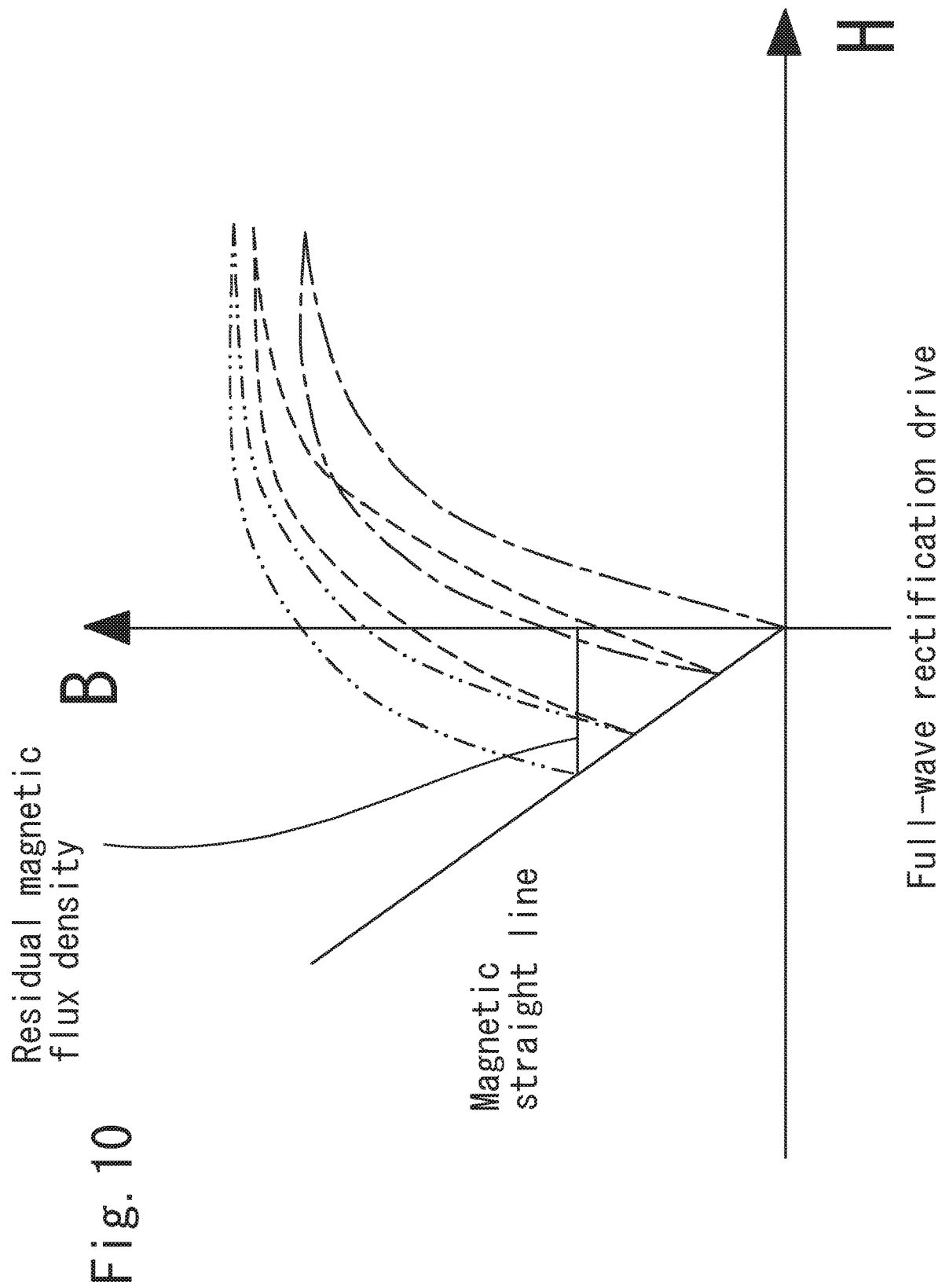
FIG. 10 is a graph where the relation of B-H when the full-wave rectification is driven is shown.
Figure 11:
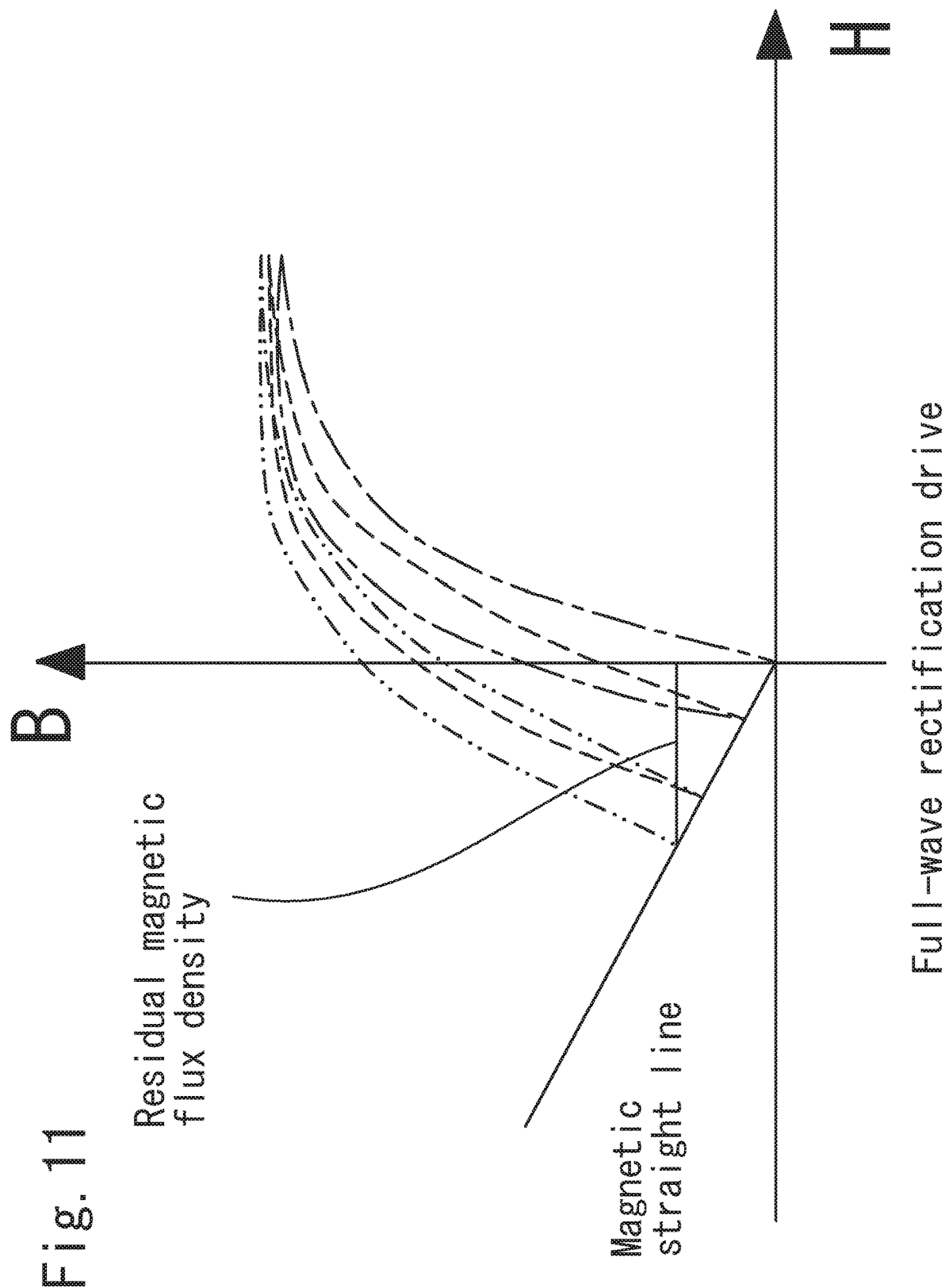
FIG. 11 is a graph where the relation of B-H at the full-wave rectification drive of the solenoid valve that uses the solenoid valve driving control device of another Embodiment of the invention is shown.
Figure 12:
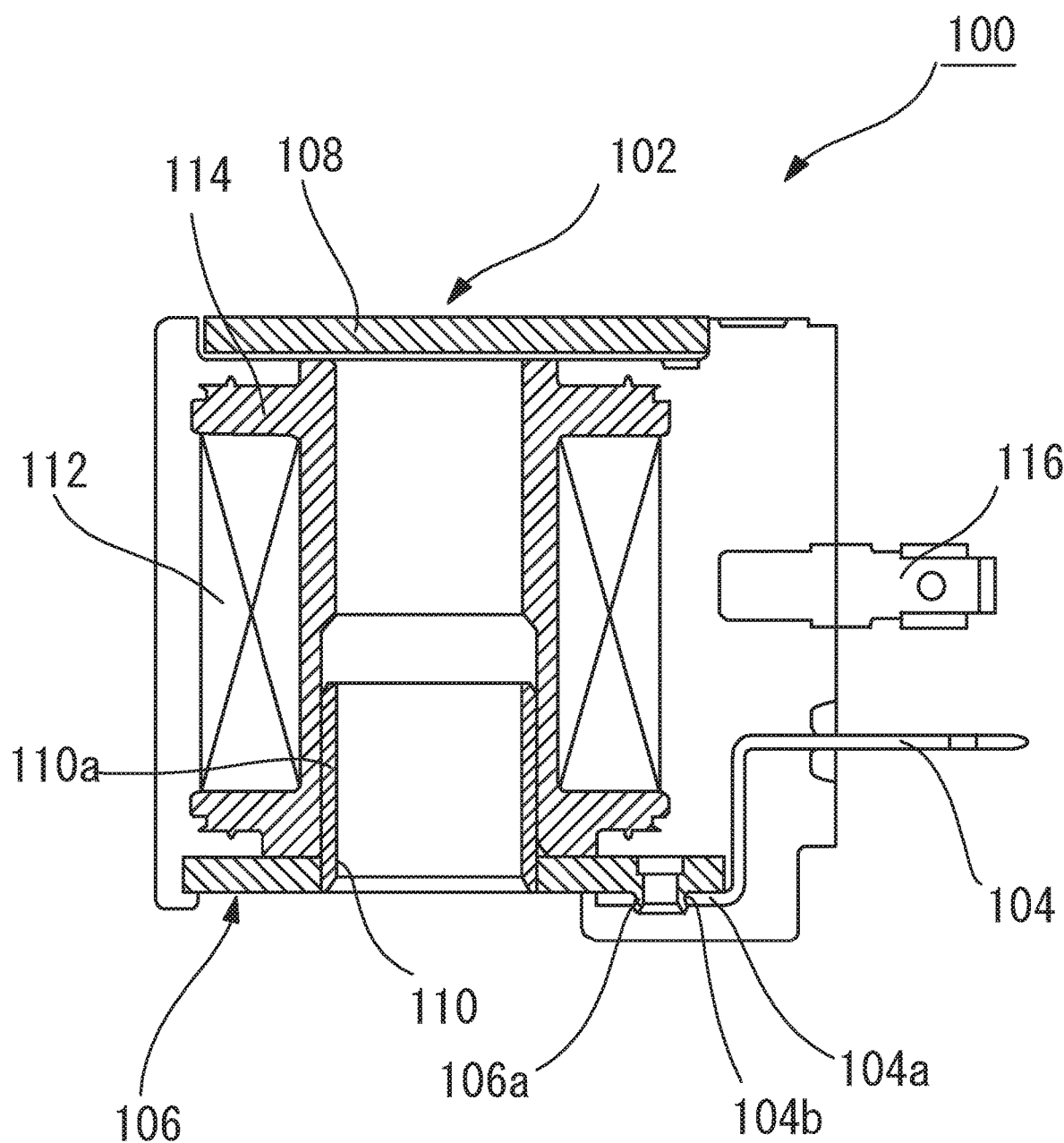
FIG. 12 is a longitudinal sectional view of the molding coil of the conventional solenoid valve.
Figure 13:
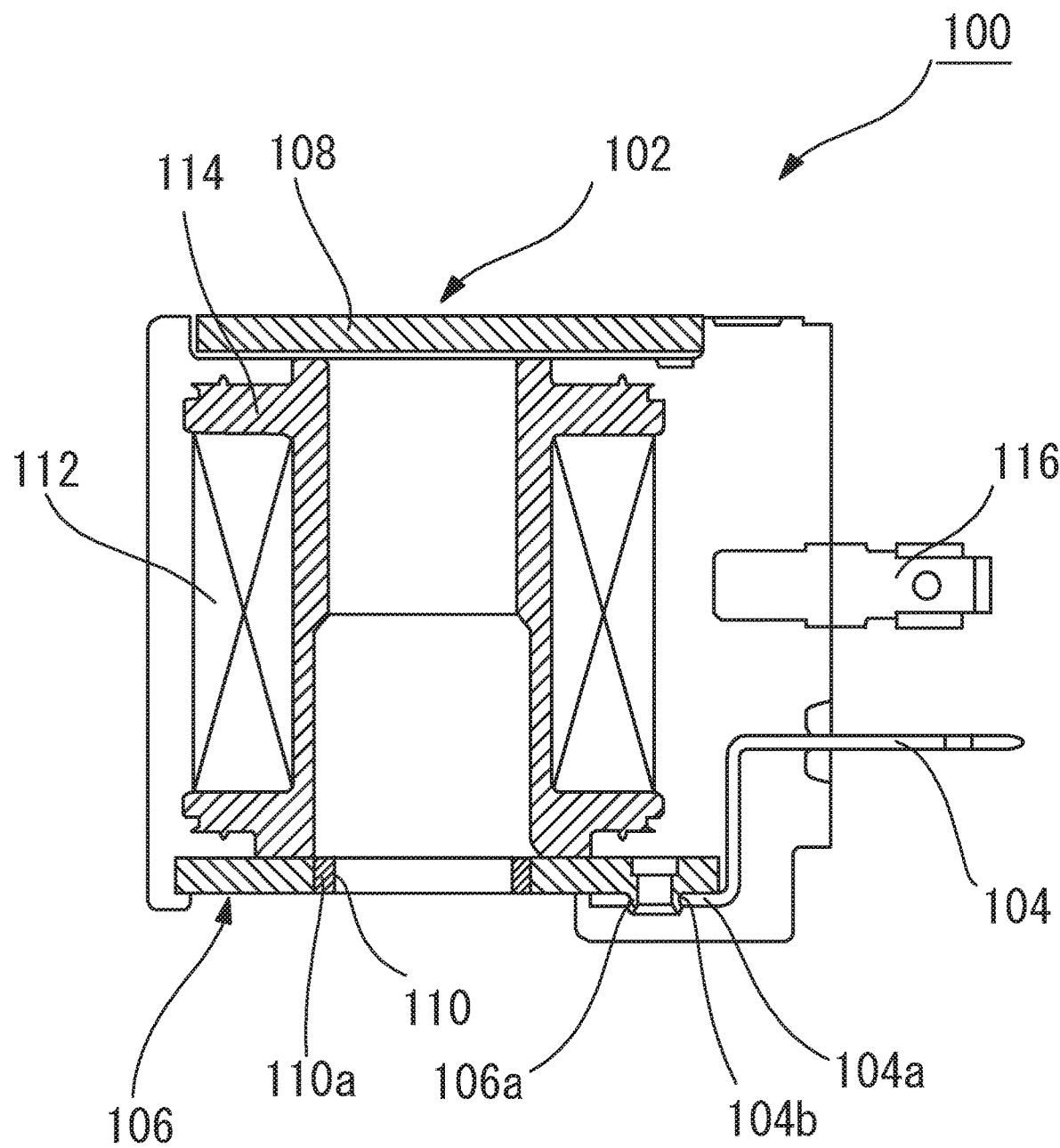
FIG. 13 is a longitudinal sectional view of the molding coil of the solenoid valve of another Embodiment of the invention.

FIG. 9 is a graph where the relation of B-H when exchange (AC) is driven is shown. FIG. 10 is a graph where the relation of B-H when the full-wave rectification is driven is shown. FIG. 11 is a graph where the relation of B-H at the full-wave rectification drive of the solenoid valve that uses the solenoid valve driving control device of another Embodiment of the invention is shown. FIG. 12 is a longitudinal sectional view of the molding coil of the conventional solenoid valve. FIG. 13 is a longitudinal sectional view of the molding coil of the solenoid valve of another Embodiment of the invention.

As apparent that comparing between FIG. 9 that is a graph where the relation of B-H when exchange (AC) is driven and FIG. 10 that is a graph where the relation of B-H when the full-wave rectification is driven, in the full-wave rectification drive of FIG. 10, the residual magnetic flux density is higher than the AC drive of FIG. 9.

That is, the chain line of FIG. 10 indicates the loop of the waveform at the application of the electric current starting. The dotted line is a loop of the waveform under application of the electric current (synthesis before 2 to final waveform). Alternate long and two short dashes line show the loop of the waveform at a final waveform. Magnetic flux density B is higher at the final waveform than the application of the electric current starting, so that the residual magnetic flux density increases in size.

Therefore, the holding power of the plunger 46 is increased by this high residual magnetic flux density. As a result, a defective release of the plunger 46 from the attracting member 34 is occurred.

For this, compared with the molding coil of the conventional Solenoid valve of FIG. 12, as shown in the molding coil of the solenoid valve of another Embodiment of the invention of FIG. 13, it may shorten the magnetic path, and the structure that the residual magnetic flux density is low may be applied.

That is, as shown in FIG. 12 and FIG. 13, in a molding coil 100, a magnetic frame 102 comprises, a lower magnetic frame 106 that is component of the base plate portion of the magnetic frame 102, and with which a ground terminal 104 is connected, and an upside magnetic frame 108.

That is, on the lower magnetic frame 106, a protrusion 106a for rivet is protruded to the outer wall side. In addition, the protrusion 106a for rivet of this lower magnetic frame 106 is engaged with to pore 104b for rivet formed to a base edge 104a of a ground terminal 104.

Moreover, to a pore 104b for rivet formed to the base edge 104a of the ground terminal 104, from the outer wall side of this lower magnetic frame 106, it is performed by riveting processing by the treatment device such as punches. As a result, to the outer wall side of the lower magnetic frame 106, the base edge 104a of the ground terminal 104 is securely connected and fixed electrically.

Moreover, to the lower magnetic frame 106, a driving portion inserting through hole 110 is formed to the center section thereof. In addition, a magnetic path member 110a that is protruded upwardly is formed to the inner periphery portion of this driving portion inserting through hole 110.

On the other hand, the molding coil 100 includes, a bobbin 114 in which a winding wire 112 is rolled, a pair of feeding power terminal 116, with which it is fixed to the bobbin 114 by pressing in, and edge of the winding wire 112 is connected electrically.

In addition, compared with the molding coil of the conventional solenoid valve of FIG. 12, as shown in the molding coil of the solenoid valve of another Embodiment of the invention of FIG. 13, the length of a magnetic path member 110a, which is protruded upwardly to the inner periphery portion of the driving portion inserting through hole 110 of the lower magnetic frame 106 that is component of a part of the magnetic path, may be shortened.

As a result, as shown in the graph where the relation of B-H of FIG. 11 is shown, compared with the graph where the relation of B-H of FIG. 10 when the full-wave rectification is driven is shown, the inclination of a magnetic straight line becomes small.

As a result, magnetic flux density B is lowered, the residual magnetic flux density becomes small, and the residual magnetic flux density becomes small. As a result, a defective release of the plunger 46 from the attracting member 34 is not occurred.

In this case, as for the magnetic path member 110a, as shown in FIG. 13, it is also possible to make the magnetic path member 110a that is another body from the lower magnetic frame 106. However, though not shown, it may be a part of the lower magnetic frame 106.

Although preferable embodiment of the invention is described above, the invention is not limited to this embodiment. In the above-mentioned Embodiment, the Embodiment that used the ac power supply is described as solenoid valve drive control device 60. However, the solenoid valve drive control device 60 of the invention can be used in ac power supply and dc power supply (pulsating current). In case of the dc power supply, the full-wave rectifier circuit 64 may be omitted.

Moreover, the invention is characterized in that the charging current in the stray capacity of the coil is not generated. Therefore, for instance, even if it is a dc power supply (for instance, rectangular wave and triangular wave) with the timing that crosses in the predetermined voltage of 0V-20V or less, it is available.

In addition, in the above-mentioned Embodiment, as for the solenoid 66, as an electric current return current member that returns to solenoid 66 when application of the electric current is interrupted, the flywheel diode is used. However, the RC snubber circuit etc. can be used for instance as an electric current return current member. However, the RC snubber circuit etc. can be used for instance as an electric current return current member. Therefore, various changes are possible in the scope in which it does not deviate from the object of the invention.

In the invention, if the degradation of power-factor is allowed, the solenoid valve that has the shading off coil (shading off ring) is available.

INDUSTRIAL APPLICABILITY

The invention relates to a solenoid valve drive control device. In more detail, the invention may be applicable to a solenoid valve drive control device and a solenoid valve comprising the solenoid valve drive control device, a plunger is moved by applying this direct current to a solenoid (electromagnetic coil), a valve element installed in the plunger is moved closely and departed to a valve seat, and a valve port formed to the valve seat is opened and closed.

EXPLANATION OF LETTERS OR NUMERALS

10 Solenoid Valve,
12 Valve element,
14 Control unit,
16 Driving portion,
18 Electromagnetic coil,
22 Molding resin,
24 Magnetic frame,
26 Base plate portion,
28 Driving portion inserting through hole,
30 Bobbin,
32 Driving portion inserting through hole,
34 Attracting member,
36 Bolt inserting through hole,
38 Upper plate portion,
40 Bolt inserting through hole,
42 Fastening bolt,
44 Plunger casing,
46 Plunger,
48 Valve seat,
50 Energisation spring,
52 Valve port,
60 Solenoid valve driving control device,
62 AC power supply,
64 Full-wave rectifier circuit,
66 Solenoid,
68 Switching means,
70 Snubber circuit,
72 zero cross timing, generation means,
74 zero cross detector circuit,
76 Timing generator circuit,
78 Electric current sensing means,
80 Current detection resistance,
82 Electric current limit comparator circuit,
84 Switching means,
100 Molding coil,
102 Magnetic frame,
104 Ground terminal,
104a Base edge,
104b Pore for rive,
106 Lower magnetic frame,
106a Protrusion for rivet,
108 Upside magnetic frame,
110 Driving portion inserting through hole,
110a Magnetic path member,
112 Winding wire,
114 Bobbin,
116 Feeding power terminal,
200 Solenoid Valve,
202 Valve element,
204 Control unit,
206 Driving portion,
208 Electromagnetic coil,
212 Molding resin,
214 Magnetic frame,
216 Base plate portion,
218 Driving portion inserting through hole,
220 Bobbin,
222 Driving portion inserting through hole,
224 Attracting member,
226 Bolt inserting through hole, 228 Upper plate portion,
230 Bolt inserting through hole,
232 Fastening bolt,
234 Plunger casing,
236 Plunger, 238 Valve seat,
240 Energisation spring,
242 Valve port,
244 Lower end surface,
246 Groove for coil installation,
248 Shading off coil,
300 Solenoid valve driving control device,
302 Full-wave rectifier circuit portion,
304 Power supply smooth portion,
306 Electromagnetic coil,
308 Comparison operation portion,
310 Driver element portion,
312 Attaching electric current instruction portion,
314 Attachment holding current instruction portion,
400 Solenoid Valve controller,
402 Valve coil,
404 Positive characteristic temperature coefficient element,
406 Relay,
408 Control unit,
410 Power unit for inverter,
412 Power unit for control,
D1 Diode,
Ia ($\beta$a) Predetermined electric current value,
Ib ($\gamma$a) Holding electric current value,
Ic ($\alpha$a) Circuit protection electric current value,
Id ($\delta$a) Dropout detection electric current value,
Q1 Transistor,
R1 Resistance,
V Power-supply voltage

The invention claimed is:
1. A solenoid valve drive control device, in which
a plunger is moved by applying an electric current to a solenoid,
a valve element installed in the plunger is moved, attached to, and separated from a valve seat,
the valve element enters into a state of an open valve by separating from the valve seat and attaching to an attracting member when the electric current is applied, and
the valve element abuts the valve seat and enters into a state of a closed valve when the electric current is not applied,
the solenoid valve drive control device comprising,
a switching device that provides and interrupts the application of the electric current to the solenoid,
a zero cross timing generation device, that controls the application of the electric current to the solenoid by the switching device, so that the application of the electric current to the solenoid is started at first zero cross timing in a power supply period, and
an electric current sensing device that detects a value of the electric current that flows to the solenoid,
an attaching operation mode in which, when the value of the electric current that flows to the solenoid detected by the electric current sensing device reaches a predetermined circuit protection electric current value Ic ($\alpha$A), which is a predetermined electric current value for attaching the plunger, after the application of the electric current to the solenoid is started by the switching device, the plunger is attached by applying a constant electric current which is set to the predetermined electric current value for attaching the plunger,
a stabilization mode that, after the attaching operation mode, repeats, plural times, an ON-OFF cycle, in which the application of the electric current to the solenoid is interrupted by the switching means when the value of the electric current that flows to the solenoid detected by the electric current sensing device reaches the circuit protection electric current value Ic ($\alpha$A), after the application of the electric current to the solenoid is started at the zero cross timing by the switching device by controlling the zero cross timing generation device,
an interruption mode in which after the stabilization mode, the application of the electric current to the solenoid is interrupted by the switching means by controlling of the zero cross timing generation device when the value of the electric current that flows to the solenoid detected by the electric current sensing device reaches a predetermined electric current value Ia ($\beta$A), after the application of the electric current to the solenoid is started by the switching device at the zero cross timing, and
a hold mode in which, after the interruption mode, a holding power is generated by discharging an energy accumulated in the solenoid through a snubber circuit until a following zero cross timing, and the value of the electric current that flows to the solenoid is set to reach a predetermined holding electric current value Ib ($\gamma$A) or more.

2. The solenoid valve drive control device as defined in claim 1 wherein the predetermined electric current value Ia($\beta$A) is an electric current value when the plunger attaches to the attracting member after the application of the electric current to the solenoid is started at the zero cross timing.

3. The solenoid valve drive control device as defined in claim 1 wherein the holding electric current value Ib($\gamma$A) is an electric current value equal to or more than a holding electric current value capable of keeping the plunger attaching the attracting member.

4. The solenoid valve drive control device as defined in claim 1 wherein a dropout sensing device that detects dropout in which a state of the plunger is changed from a state of attachment to the attracting member in the hold mode is provided.

5. The solenoid valve drive control device as defined in claim 4 wherein the dropout sensing device is configured to measure a period of time until
the value of the electric current that flows to the solenoid detected by the electric current sensing means reaches the predetermined electric current value Ia($\beta$A) since the application of the electric current to the solenoid is started, and
detect the dropout by determining whether the measured period of time is predetermined dropout detection time.

6. The solenoid valve drive control device as defined in claim 4 wherein
an electric current value when the application of the electric current to the solenoid is started at the zero cross timing is measured by an electric current sensing device, and
the dropout sensing means detects the dropout by determining whether the measured electric current value is the predetermined dropout detection electric current value Id($\delta$A) or less.

7. The solenoid valve drive control device as defined in claim 1, comprising a circuit protection means that interrupts the application of the electric current by the switching device in the attaching operation mode, when the value of the electric current that flows to the solenoid detected by the electric current sensing device reaches the predetermined electric current value Ic($\alpha$A).

8. A solenoid valve comprising the solenoid valve driving control device as defined in claim 1.

* * * * *